(12) United States Patent
Kanehara et al.

(10) Patent No.: US 10,894,571 B2
(45) Date of Patent: Jan. 19, 2021

(54) LEANING VEHICLE

(71) Applicant: YAMAHA HATSUDOKI KABUSHIKI KAISHA, Iwata (JP)

(72) Inventors: Shuhei Kanehara, Iwata (JP); Yukihide Fukuhara, Iwata (JP); Nobuo Hara, Iwata (JP); Takeshi Toyota, Iwata (JP)

(73) Assignee: YAMAHA HATSUDOKI KABUSHIKI KAISHA, Iwata (JP)

(*) Notice: Subject to any disclaimer, the term of this patent is extended or adjusted under 35 U.S.C. 154(b) by 0 days.

(21) Appl. No.: 15/976,998

(22) Filed: May 11, 2018

(65) Prior Publication Data

US 2018/0257731 A1    Sep. 13, 2018

Related U.S. Application Data

(63) Continuation of application No. PCT/JP2016/083613, filed on Nov. 11, 2016.

(30) Foreign Application Priority Data

Nov. 13, 2015  (JP) ................................. 2015-223253

(51) Int. Cl.
| | |
|---|---|
| *B62K 5/10* | (2013.01) |
| *B60G 21/05* | (2006.01) |
| *B62K 5/08* | (2006.01) |
| *B62K 5/05* | (2013.01) |
| *F16D 55/28* | (2006.01) |
| *B62K 5/027* | (2013.01) |

(Continued)

(52) U.S. Cl.
CPC ................ *B62K 5/10* (2013.01); *B60G 21/05* (2013.01); *B62K 5/027* (2013.01); *B62K 5/05* (2013.01); *B62K 5/08* (2013.01); *B62L 1/005* (2013.01); *F16D 55/28* (2013.01); *F16H 1/20* (2013.01); *F16H 21/44* (2013.01)

(58) Field of Classification Search
CPC combination set(s) only.
See application file for complete search history.

(56) References Cited

U.S. PATENT DOCUMENTS 8,123,240 B2    2/2012  Mercier
8,583,325 B2 *  11/2013  Carabelli ............... B62K 5/027
                                                701/38

(Continued)

FOREIGN PATENT DOCUMENTS

JP    S61-229608 A    10/1986
JP    2010-52666 A    3/2010

(Continued)

*Primary Examiner* — Barry Gooden, Jr.
(74) *Attorney, Agent, or Firm* — Rabin & Berdo, P.C.

(57) ABSTRACT

A leaning vehicle includes a vehicle body, a left wheel, a right wheel, a leaning mechanism, a leaning drive mechanism and a leaning brake mechanism. The leaning drive mechanism includes a drive source. The leaning drive mechanism includes a gear, rotary shafts, and a gear casing member. The leaning brake mechanism includes a brake member and a resistance applying member. The gear and the rotary shaft of the leaning drive mechanism and the brake member of the leaning brake mechanism are supported by the vehicle body in a rotatable manner by way of the gear casing member of the leaning drive mechanism.

11 Claims, 21 Drawing Sheets

(51) Int. Cl.
 *B62L 1/00*   (2006.01)
 *F16H 1/20*   (2006.01)
 *F16H 21/44*  (2006.01)

(56) References Cited

U.S. PATENT DOCUMENTS

| | | | |
|---|---|---|---|
| 9,278,711 B2* | 3/2016 | Takano | B62K 5/05 |
| 2005/0167174 A1* | 8/2005 | Marcacci | B60G 17/0152 |
| | | | 180/76 |
| 2008/0197597 A1* | 8/2008 | Moulene | B62D 31/003 |
| | | | 280/124.103 |
| 2009/0194961 A1* | 8/2009 | Dieziger | B60G 3/20 |
| | | | 280/124.103 |
| 2011/0006498 A1* | 1/2011 | Mercier | B62D 9/02 |
| | | | 280/124.103 |
| 2011/0275256 A1 | 11/2011 | Gibbs et al. | |
| 2012/0098225 A1* | 4/2012 | Lucas | B60G 3/20 |
| | | | 280/124.103 |
| 2012/0248717 A1* | 10/2012 | Tsujii | B62K 5/01 |
| | | | 280/5.509 |
| 2012/0310478 A1 | 12/2012 | Carabelli et al. | |
| 2013/0168944 A1* | 7/2013 | Bartolozzi | B60G 3/01 |
| | | | 280/269 |
| 2014/0172286 A1* | 6/2014 | Moulene | G05D 1/0891 |
| | | | 701/124 |
| 2014/0375015 A1 | 12/2014 | Yu | |
| 2015/0183484 A1* | 7/2015 | Aillet | B62K 5/01 |
| | | | 280/62 |
| 2015/0239522 A1* | 8/2015 | Iizuka | B62K 5/027 |
| | | | 280/267 |
| 2015/0246704 A1* | 9/2015 | Takano | B60G 17/005 |
| | | | 280/269 |
| 2016/0229246 A1* | 8/2016 | Mori | B60G 3/26 |
| 2016/0229249 A1* | 8/2016 | Mori | B62D 7/18 |
| 2016/0229251 A1* | 8/2016 | Mori | B60G 13/003 |
| 2016/0375948 A1* | 12/2016 | Takenaka | B62K 5/10 |
| | | | 280/5.506 |
| 2017/0088219 A1* | 3/2017 | Yoshikuni | B60G 13/003 |
| 2017/0106930 A1* | 4/2017 | Hara | B62K 5/027 |
| 2017/0106935 A1* | 4/2017 | Hara | B62K 5/10 |
| 2017/0106936 A1* | 4/2017 | Shibuya | B62K 5/027 |
| 2018/0086168 A1* | 3/2018 | Iguchi | B60G 17/0162 |
| 2018/0257706 A1* | 9/2018 | Kanehara | B62D 9/02 |
| 2018/0257728 A1* | 9/2018 | Kanehara | B62K 5/08 |
| 2020/0102037 A1* | 4/2020 | Hirayama | B62K 5/10 |
| 2020/0102038 A1* | 4/2020 | Takimoto | B62D 9/02 |
| 2020/0102039 A1* | 4/2020 | Takimoto | B62K 5/08 |

FOREIGN PATENT DOCUMENTS

| | | |
|---|---|---|
| JP | 2010-254164 A | 11/2010 |
| JP | 2011-046296 A | 3/2011 |
| JP | 4668646 B2 | 4/2011 |
| JP | 2012-025370 A | 2/2012 |
| JP | 2015-155300 A | 8/2015 |
| WO | WO-2011/061768 A1 | 5/2011 |
| WO | WO 2013-051195 A1 | 4/2013 |

* cited by examiner

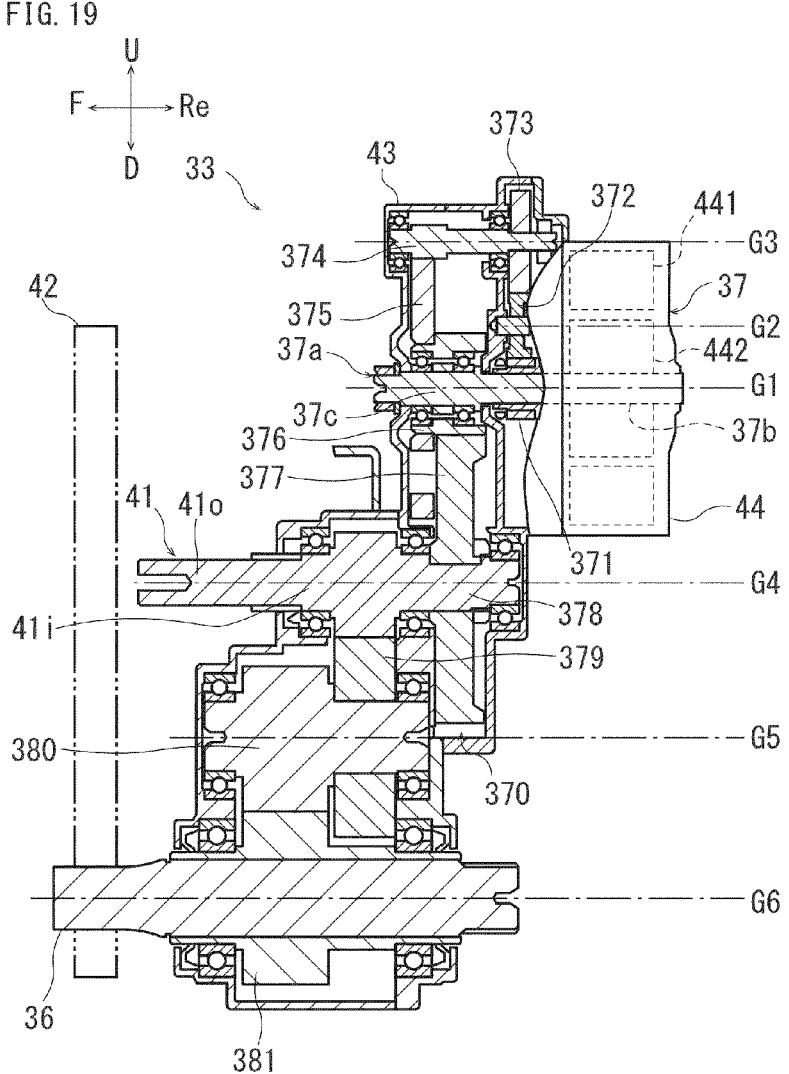

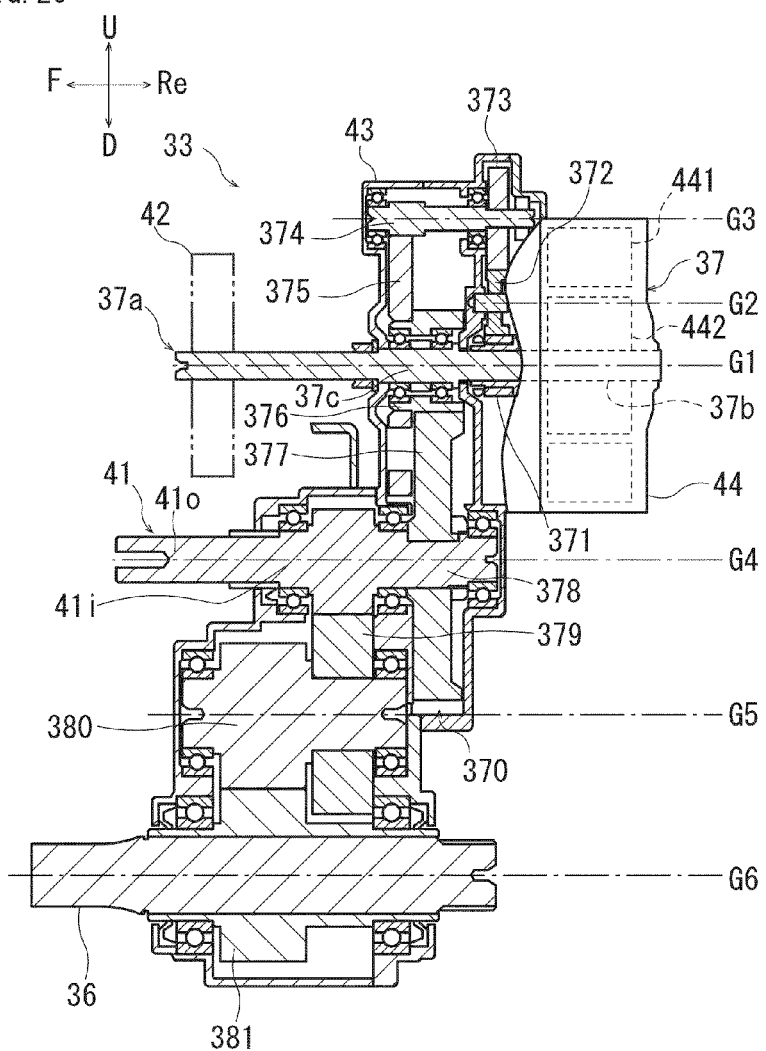

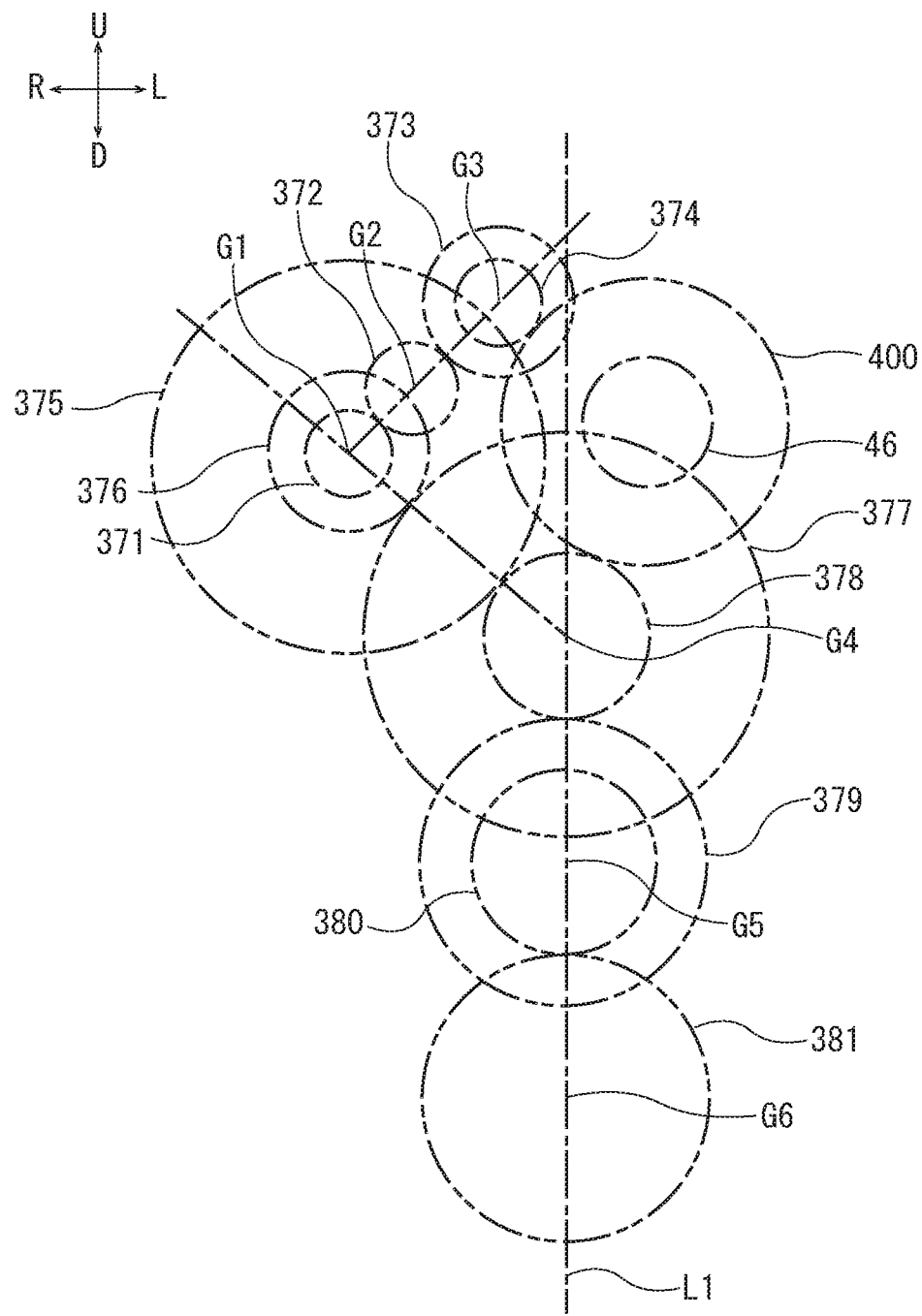

LEANING VEHICLE

CROSS-REFERENCE TO RELATED APPLICATION

This application is a continuation of International Application PCT/JP2016/083613 filed on Nov. 11, 2016, which claims priority from Japanese Patent Application No. 2015-223253 filed on Nov. 13, 2015. The contents of each of the identified applications are entirely incorporated herein by reference.

TECHNICAL FIELD

The present invention relates to a leaning vehicle which includes: a vehicle body capable of leaning in the left-right direction of the vehicle; and two wheels arranged in the left-right direction of the vehicle body.

BACKGROUND ART

There has been known a vehicle which includes a vehicle body capable of leaning in the left-right direction of the vehicle, that is, a leaning vehicle. The leaning vehicle includes a support arm supported in a rotatable manner about an axis extending in the front-back direction of the vehicle with respect to the vehicle body. The support arm includes: a left support arm positioned on the left side of the center of the vehicle body in the left-right direction; and a right support arm positioned on the right side of the center of the vehicle body in the left-right direction. The left support arm supports a left wheel in a rotatable manner about an axis extending in the front-back direction of the vehicle. The right support arm supports a right wheel in a rotatable manner about an axis extending in the front-back direction of the vehicle.

For example, as disclosed in Patent Literature 1 (identified further on), there has been known a leaning vehicle including a motor which applies a rotational force about an axis extending in the front-back direction of the vehicle body to a left support arm and a right support arm so as to cause a vehicle body to lean.

As disclosed in Patent Literature 1, there has been also known a leaning vehicle which includes a brake for locking a rotational position of the left support arm and the right support arm with respect to the vehicle body so as to allow the vehicle body to maintain an upright state or a lean state. The leaning vehicle disclosed in Patent Literature 1 includes a leaning mechanism which causes the vehicle body, a left wheel, and a right wheel to lean in the left-right direction of the leaning vehicle. The leaning vehicle disclosed in Patent Literature 1 includes both a leaning drive mechanism and a leaning brake mechanism. The leaning drive mechanism includes a motor for applying a driving force which causes a support arm member to rotate with respect to the vehicle body. The leaning brake mechanism can allow the vehicle body to maintain an upright state or a lean state.

CITATION LIST

Patent Literature

Patent Literature 1: International Application Publication No. WO2011/061768

However, it is necessary to dispose the leaning drive mechanism and the leaning brake mechanism at a position in the vicinity of the leaning mechanism in the leaning vehicle, making the leaning vehicle increase in size.

SUMMARY

It is an object of the present invention to provide a leaning vehicle where a size increase of the leaning vehicle can be suppressed even when the leaning vehicle includes a leaning drive mechanism which causes a vehicle body, a left wheel and a right wheel to lean and a leaning brake mechanism which maintains an upright state or a lean state of the vehicle body, the left wheel and the right wheel.

Inventors of the present invention have studied the cause of a size increase of a leaning vehicle in detail. The leaning mechanism moves with respect to the vehicle body. Accordingly, the vehicle body is required to avoid any interference with the leaning mechanism or components which move together with the leaning mechanism. Accordingly, a restriction is imposed on a shape of the vehicle body around the leaning mechanism by the leaning mechanism or the components which move together with the leaning mechanism. In other words, a degree of freedom in the shape of the vehicle body around the leaning mechanism is low.

The leaning drive mechanism is required to be connected to both the vehicle body and the leaning mechanism. The leaning brake mechanism is also required to be connected to both the vehicle body and the leaning mechanism. The leaning drive mechanism and the leaning brake mechanism are required to be supported by the vehicle body while avoiding interference with the leaning mechanism. A degree of freedom in the shape of the vehicle body around the leaning mechanism is low and hence, a support structure for supporting the leaning drive mechanism and the leaning brake mechanism from the vehicle body becomes complicated. It is found that the vehicle body increases in size due to this complicated structure. In view of the above, the inventors of the present invention have arrived at an idea of suppressing a size increase of the vehicle body by simplifying the support structure for supporting the leaning drive mechanism and the leaning brake mechanism from the vehicle body.

In the process of studying various support structures, the inventors of the present invention have found that the number of support points on the vehicle body can be reduced by integrating the leaning drive mechanism and the leaning brake mechanism into one mechanism. The inventors of the present invention have arrived at the idea of transmitting a driving force of the leaning drive mechanism by a mechanism which includes a gear and a rotatable rotary shaft, and providing a brake member to one of the gear or the rotary shaft. The inventors of the present invention have found that, with such a configuration, a resistance of the leaning brake mechanism can be transmitted through the gear or the rotary shaft for transmitting a driving force of the leaning drive mechanism and hence, the mechanism can be condensed. The inventors of the present invention have also found that, by supporting a brake member of the leaning brake mechanism from the vehicle body by way of a casing member of the leaning drive mechanism, a support structure for supporting the leaning brake mechanism and the leaning drive mechanism from the vehicle body can be simplified and hence, a size increase of the vehicle body around the leaning mechanism can be suppressed.

A leaning vehicle according to this embodiment includes: a vehicle body; a left wheel; a right wheel; a leaning mechanism; a leaning drive mechanism; and a leaning brake mechanism. The vehicle body leans left with turning of the leaning vehicle leftward in a left-right direction of the leaning vehicle, and leans right with turning of the leaning vehicle rightward in the left-right direction of the leaning vehicle. The left wheel is disposed at the left side of a center of the vehicle body in the left-right direction of the vehicle body. The right wheel is disposed at the right side of the center of the vehicle body in the left-right direction of the vehicle body, and on a right side of the left wheel. The leaning mechanism includes a support arm. The support arm supports the left wheel and the right wheel, and is supported by the vehicle body in a rotatable manner about a rotation axis extending in a front-back direction of the vehicle body. The leaning drive mechanism is supported by the vehicle body. The leaning drive mechanism includes a drive source. The drive source generates a driving force which causes the support arm to rotate with respect to the vehicle body. The leaning brake mechanism applies a resistance to a rotation of the support arm with respect to the vehicle body. The leaning drive mechanism includes a gear, a rotary shaft, and a gear casing member. The gear and the rotary shaft are connected to the drive source and the support arm, and rotate in an interlocking manner with the support arm. The gear casing member accommodates at least a portion of the gear and a portion of the rotary shaft. The leaning drive mechanism transmits the driving force generated by the drive source to the support arm through the gear and the rotary shaft. The leaning brake mechanism includes a brake member, and a resistance applying member. The brake member is connected to one of the gear or the rotary shaft, and rotates in an interlocking manner with the support arm by way of the gear or the rotary shaft to which the brake member is connected. The resistance applying member applies a resistance to a motion of the brake member with respect to the vehicle body. The gear and the rotary shaft of the leaning drive mechanism and the brake member of the leaning brake mechanism are rotatable with respect to the gear casing member of the leaning drive mechanism. The gear and the rotary shaft of the leaning drive mechanism and the brake member of the leaning brake mechanism are supported by the vehicle body in a rotatable manner by way of the gear casing member of the leaning drive mechanism.

According to the leaning vehicle of this embodiment, the drive source and the gear casing member forming the leaning drive mechanism and the brake member forming the leaning brake mechanism are formed into one integral body. With such a configuration, the drive source and the brake member are not supported by the vehicle body. Accordingly, the support structure for supporting the leaning drive mechanism and the leaning brake mechanism from the vehicle body is simple. For this reason, a size increase of the vehicle body around the leaning mechanism can be suppressed.

The gear casing member of the leaning drive mechanism may include a front casing piece and a rear casing piece arranged in the front-back direction of the vehicle body.

According to the above-mentioned leaning vehicle, the gear and the rotary shaft which are accommodated in the gear casing member are disposed along the front-back direction of the vehicle body. With such a configuration, less restriction is imposed on a space between the vehicle body and the leaning mechanism where the leaning drive mechanism and the leaning brake mechanism are disposed.

Axes of rotation of the gear and the rotary shaft of the leaning drive mechanism and an axis of rotation of the brake member of the leaning brake mechanism may be set so as to extend along the front-back direction of the vehicle body.

According to the above-mentioned leaning vehicle, less restriction is imposed on a space between the vehicle body and the leaning mechanism where the leaning drive mechanism and the leaning brake mechanism are disposed.

The gear casing member of the leaning drive mechanism may include a plurality of casing pieces. One of the plurality of casing pieces may be supported by the vehicle body. Another of the plurality of casing pieces may be supported by the vehicle body by way of one casing piece.

According to the above-mentioned leaning vehicle, the gear casing member is divided into at least two casing pieces. One casing piece is supported by the vehicle body. The other casing piece is connected to the casing piece supported by the vehicle body. It is unnecessary for at least one casing piece to be supported by the vehicle body. Accordingly, the support structure for supporting the gear casing member from the vehicle body can be further simplified.

The gear of the leaning drive mechanism may include a plurality of gears. The gear may decelerate the driving force generated by the drive source, and transmit the driving force to the support arm. The brake member of the leaning brake mechanism may be connected to the gear or the rotary shaft of the leaning drive mechanism which rotates at a reduced rotational speed.

According to the above-mentioned leaning vehicle, the brake member is provided by making use of one of the gears for transmitting a driving force. Accordingly, the structure of the leaning brake mechanism can be made simple.

An upper end of the brake member may be disposed at a position lower than an upper end of the gear casing member in an up-down direction of the vehicle body. A lower end of the brake member may be disposed at a position higher than a lower end of the gear casing member in the up-down direction of the vehicle body. With such a configuration, the brake member has a small size and hence, less restriction is imposed on a space for disposing the leaning brake mechanism.

At least one of a front end or a rear end of the brake member may be positioned between a front end and a rear end of the gear casing member in the front-back direction of the vehicle body. With such a configuration, the brake member has a small size and hence, less restriction is imposed on a space for disposing the leaning brake mechanism.

The leaning drive mechanism may include an output shaft which outputs the driving force of the drive source, and is connected to the support arm. The resistance applying member of the leaning brake mechanism may apply a resistance to the brake member at a position higher than the output shaft in the up-down direction of the vehicle body. With such a configuration, the brake member has a small size and hence, less restriction is imposed on a space for disposing the leaning brake mechanism.

At least one of a left end or a right end of the brake member may be positioned between a left end and a right end of the gear casing member in the left-right direction of the vehicle body. With such a configuration, the brake member has a small size and hence, less restriction is imposed on a space for disposing the leaning brake mechanism.

Advantageous Effects of Invention

According to the present invention, under the condition of low degree of freedom in the shape of the vehicle body around the leaning mechanism, the support structure for supporting the leaning brake mechanism and the leaning drive mechanism from the vehicle body can be simplified.

Accordingly, a size increase of the vehicle body around the leaning mechanism can be suppressed. As a result, even when the leaning vehicle includes the leaning drive mechanism which causes the vehicle body, the left wheel and the right wheel to lean and the leaning brake mechanism which maintains an upright state or a lean state of the vehicle body, the left wheel and the right wheel, a size increase of the leaning vehicle can be suppressed.

BRIEF DESCRIPTION OF THE DRAWINGS

FIG. 19 is a cross-sectional view of a portion of the leaning drive mechanism and a portion of the leaning brake mechanism in the second embodiment.

FIG. 20 is a cross-sectional view of a portion of a leaning drive mechanism and a portion of a leaning brake mechanism in a third embodiment.

FIG. 21 is a view describing positions of axes of speed reduction gears in a fourth embodiment when a vehicle is viewed from the front side.

DETAILED DESCRIPTION

Figure 1:
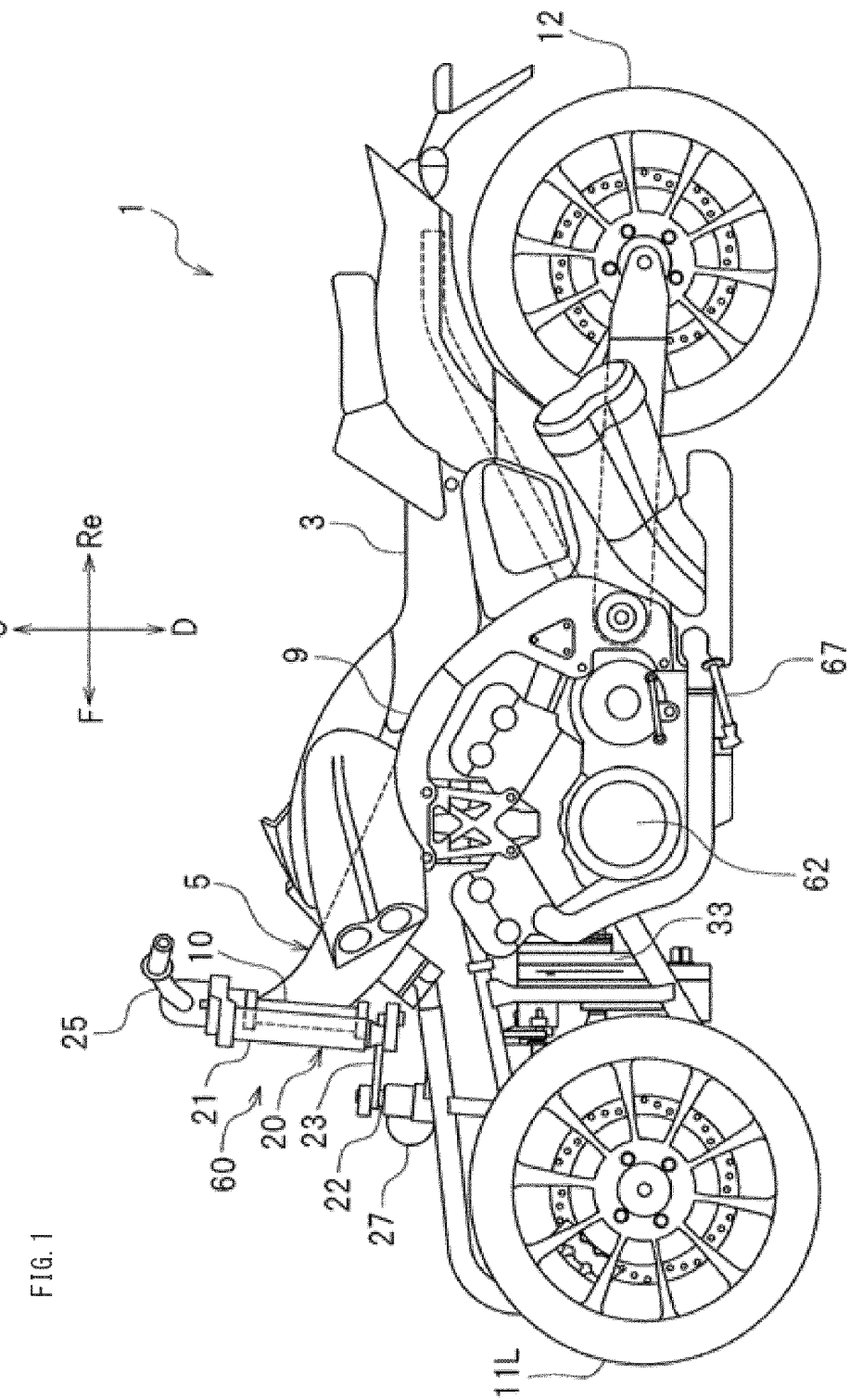
FIG. 1 is a left side view of a leaning vehicle according to one embodiment of the present invention.
Figure 2:
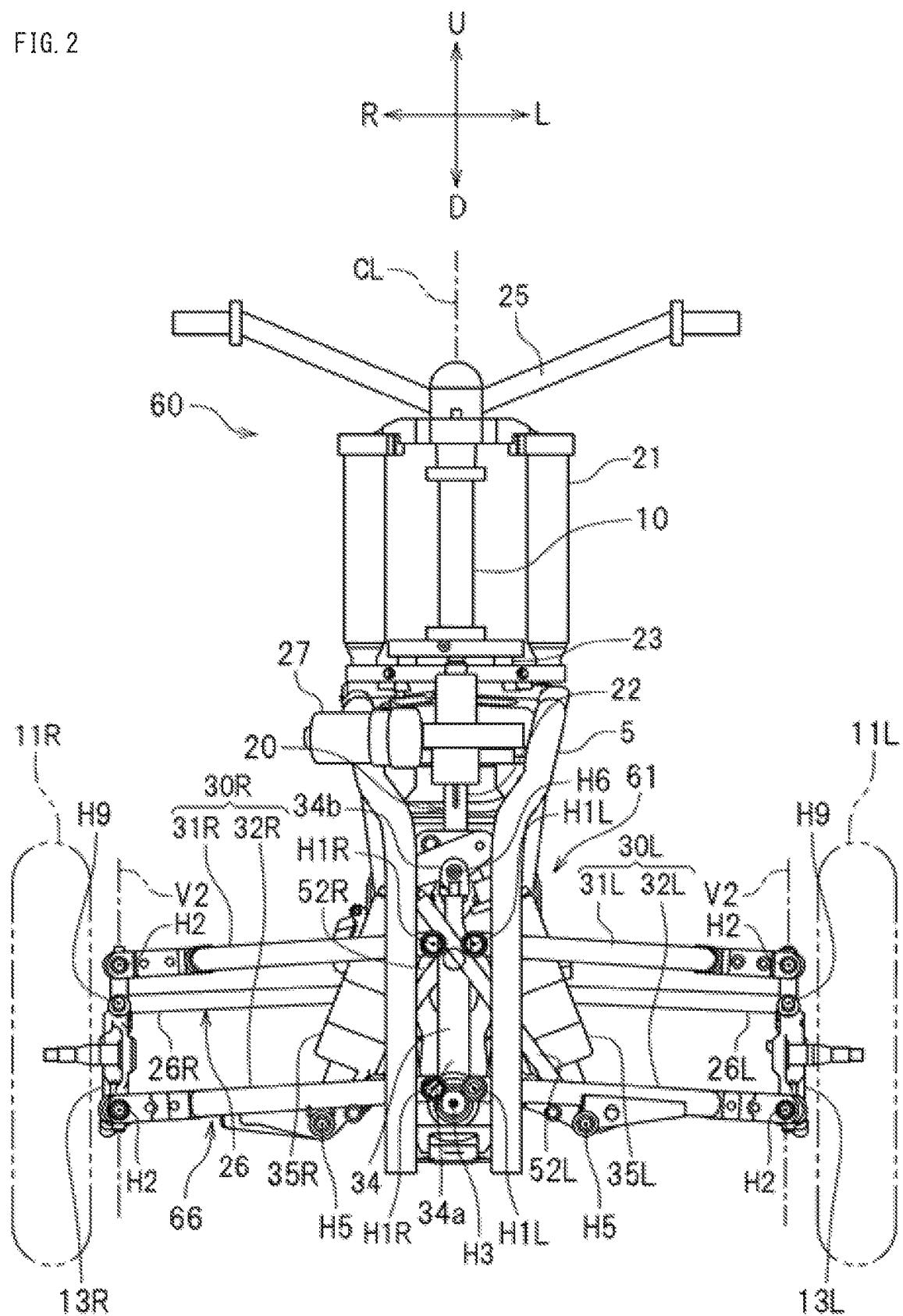
FIG. 2 is a front view of a portion of the leaning vehicle when a vehicle body is in an upright state.
Figure 3:
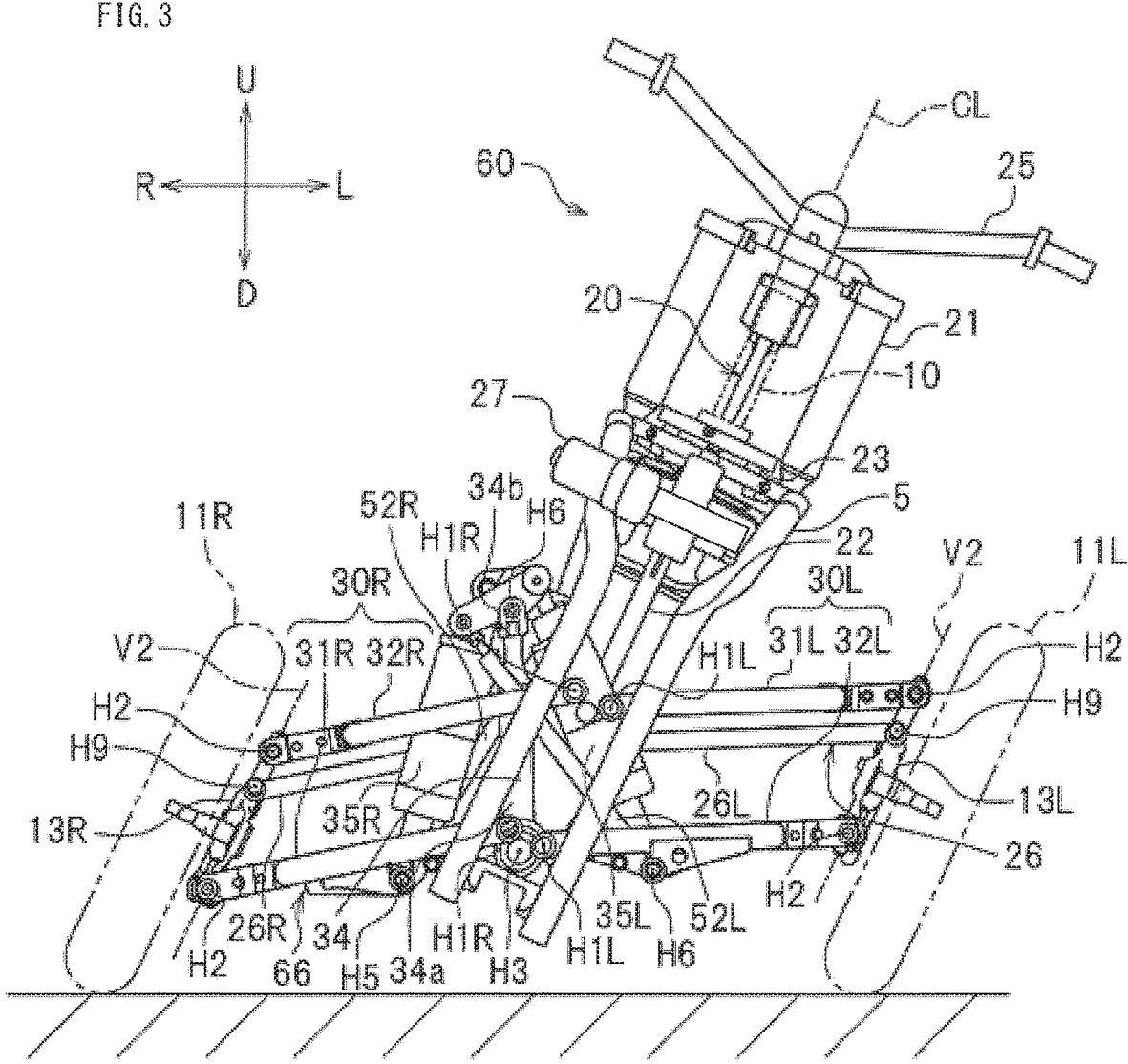
FIG. 3 is a front view of a portion of the leaning vehicle when the vehicle body is in a lean state.

Hereinafter, embodiments of the present invention are described with reference to drawings. Referring to FIG. 1 and FIG. 2, a leaning vehicle according to this embodiment is a saddle-ride type three-wheeled vehicle (hereinafter, simply referred to as "vehicle") 1 including two front wheels 11L, 11R and one rear wheel 12. In this specification, referring to FIG. 3, "leaning vehicle" means a vehicle where a vehicle body 5 is capable of leaning with respect to a ground surface, and a relative position between the left front wheel 11L and the right front wheel 11R in the up-down direction of the vehicle body 5 changes along with a lean of the vehicle body 5. Unless otherwise specified, "front", "rear", "left", "right", "up" and "down" respectively mean "front", "rear", "left", "right", "up" and "down" as viewed by an occupant seated on a seat 3 when the vehicle 1 is stationary on a horizontal plane in a non-steering state. Reference characters "F", "Re", "L", "R", "U", and "D" in the drawing respectively denote "front", "rear", "left", "right", "up", and "down". The description "the front-back direction of the vehicle body", the description "the up-down direction of the vehicle body", and the description "the left-right direction of the vehicle body" mean the front-back direction, the up-down direction, and the left-right direction with reference to the vehicle body. In a state where the vehicle 1 is not steered and the vehicle body 5 is upright, the front-back direction, the up-down direction, and the left-right direction of the vehicle body 5 respectively agree with the front-back direction, the up-down direction, and the left-right direction of the vehicle 1. However, when the vehicle 1 is in a steering state or the vehicle body 5 is in a leaning state, the front-back direction, the up-down direction, and the left-right direction of the vehicle body 5 may not agree with the front-back direction, the up-down direction, and the left-right direction of the vehicle 1 respectively. The description "an axis extending in the front-back direction" is not limited to an axis which is parallel to the front-back direction, and also includes an axis leaning with respect to the front-back direction within a range of −45° to +45°. In the same manner, "an axis extending in the up-down direction" includes an axis leaning with respect to the up-down direction within a range of −45° to +45°, and "an axis extending in the left-right direction" includes an axis leaning with respect to the left-right direction within a range of −45° to +45°.

First Embodiment

Referring to FIG. 1 and FIG. 2, the vehicle 1 includes: the vehicle body 5; the left front wheel 11L; the right front wheel 11R; the rear wheel 12; a steering mechanism 60; a leaning mechanism 61; the seat 3; and a power unit 62.

Referring to FIG. 1, the vehicle body 5 includes a head pipe 10 and a main frame 9 extending rearward from the head pipe 10 when the vehicle is viewed from the side. The head pipe 10 extends in the obliquely rearward and upward direction when the vehicle is viewed from the side. Referring to FIG. 2, the head pipe 10 extends in the up-down direction when the vehicle is viewed from the front side. The vehicle body 5 leans left when the vehicle 1 turns left in the left-right direction of the vehicle 1. The vehicle body 5 leans right when the vehicle 1 turns right in the left-right direction of the vehicle 1.

The configuration of the power unit 62 is by no means limited. For example, the power unit 62 may include an internal combustion engine. Alternatively, the power unit 62 may include an electric motor.

The leaning mechanism 61 is a double wishbone suspension. The leaning mechanism 61 includes: a left support arm 30L; a right support arm 30R; a center arm 34; a left cushion unit 35L; and a right cushion unit 35R. The left support arm 30L supports the left front wheel 11L. The right support arm 30R supports the right front wheel 11R. The left support arm 30L and the right support arm 30R form a link mechanism 66 which causes a relative position between the left front wheel 11L and the right front wheel 11R in the up-down direction of the vehicle body 5 to change corresponding to a lean of the vehicle body 5. The center arm 34 is an arm which is supported by the vehicle body 5 in a swingable manner about an axis extending in the front-back direction of the vehicle body 5 and, at the same time, transmits an upward motion of the left front wheel 11L to the right front wheel 11R as a downward motion, and transmits an upward motion of the right front wheel 11R to the left front wheel 11L as a downward motion.

The left support arm 30L includes a left lower arm 32L and a left upper arm 31L disposed at the up side of the left lower arm 32L. The left lower arm 32L and the left upper arm 31L are disposed at the left side of a vehicle center line CL. The description "vehicle center line CL" means a line intersecting with a center axis of the head pipe 10, and extending in the front-back direction of the vehicle body 5.

Figure 4:
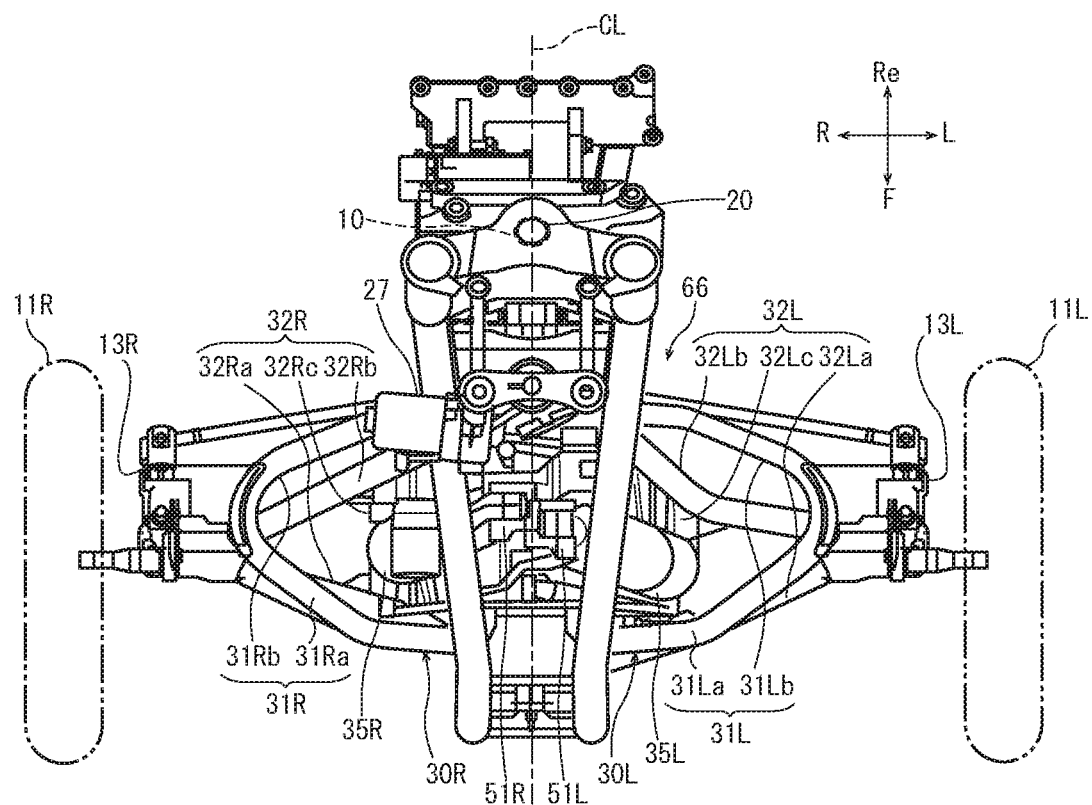
FIG. 4 is a plan view of a portion of the leaning vehicle.

Referring to FIG. 4, the left lower arm 32L includes: a front half portion 32La; a rear half portion 32Lb; and a crossbar 32Lc. The rear half portion 32Lb is positioned at the rear side of the front half portion 32La. The crossbar 32Lc connects the front half portion 32La and the rear half portion 32Lb with each other. The front half portion 32La and the rear half portion 32Lb are formed such that a distance between the front half portion 32La and the rear half portion 32Lb decreases as these portions extend leftward. A left end portion of the front half portion 32La is connected with a left end portion of the rear half portion 32Lb. The crossbar 32Lc extends in the front-back direction of the vehicle body 5. The left upper arm 31L includes a front half portion 31La and a rear half portion 31Lb. The rear half portion 31Lb is positioned at the rear side of the front half portion 31La. The front half portion 31La and the rear half portion 31Lb are formed such that a distance between the front half portion 31La and the rear half portion 31Lb decreases as these portions extend leftward. A left end portion of the front half portion 31La is connected with a left end portion of the rear half portion 31Lb.

Referring to FIG. 2, a right end portion of the left lower arm 32L and a right end portion of the left upper arm 31L are supported by the vehicle body 5 in a swingable manner in the up-down direction about first left axes H1L extending in the front-back direction of the vehicle body 5. A left end portion of the left lower arm 32L and a left end portion of the left upper arm 31L are supported by a left knuckle arm 13L in a swingable manner in the up-down direction about second left axes H2 extending in the front-back direction of the vehicle body 5.

The right support arm 30R has a shape which is left-right symmetrically with the left support arm 30L with respect to the vehicle center line CL. The right support arm 30R includes a right lower arm 32R and a right upper arm 31R disposed at the up side of the right lower arm 32R. The right lower arm 32R and the right upper arm 31R are disposed at the right side of the vehicle center line CL.

Referring to FIG. 4, the right lower arm 32R includes: a front half portion 32Ra; a rear half portion 32Rb; and a crossbar 32Rc. The rear half portion 32Rb is positioned at the rear side of the front half portion 32Ra. The crossbar 32Rc connects the front half portion 32Ra and the rear half portion 32Rb with each other. The front half portion 32Ra and the rear half portion 32Rb are formed such that a distance between the front half portion 32Ra and the rear half portion 32Rb decreases as these portions extend rightward. A right end portion of the front half portion 32Ra is connected with a right end portion of the rear half portion 32Rb. The crossbar 32Rc extends in the front-back direction of the vehicle body 5. The right upper arm 31R includes a front half portion 31Ra and a rear half portion 31Rb. The rear half portion 31Rb is positioned at the rear side of the front half portion 31Ra. The front half portion 31Ra and the rear half portion 31Rb are formed such that a distance between the front half portion 31Ra and the rear half portion 31Rb decreases as these portions extend rightward. A right end portion of the front half portion 31Ra is connected with a right end portion of the rear half portion 31Rb.

Referring to FIG. 2, a left end portion of the right lower arm 32R and a left end portion of the right upper arm 31R are supported by the vehicle body 5 in a swingable manner in the up-down direction about first right axes H1R extending in the front-back direction of the vehicle body 5. A right end portion of the right lower arm 32R and a right end portion of the right upper arm 31R are supported by a right knuckle arm 13R in a swingable manner in the up-down direction about second right axes H2 extending in the front-back direction of the vehicle body 5.

The left front wheel 11L is disposed at the left side of the vehicle center line CL, and is rotatably supported by the left knuckle arm 13L. The right front wheel 11R is disposed at the right side of the vehicle center line CL, and is rotatably supported by the right knuckle arm 13R.

The center arm 34 in this embodiment is formed into a plate shape extending in the up-down direction. However, a shape of the center arm 34 is not particularly limited. A lower end portion 34a of the center arm 34 is supported by the vehicle body 5 in a freely swingable manner about an axis H3 extending in the front-back direction of the vehicle body 5.

Figure 5:
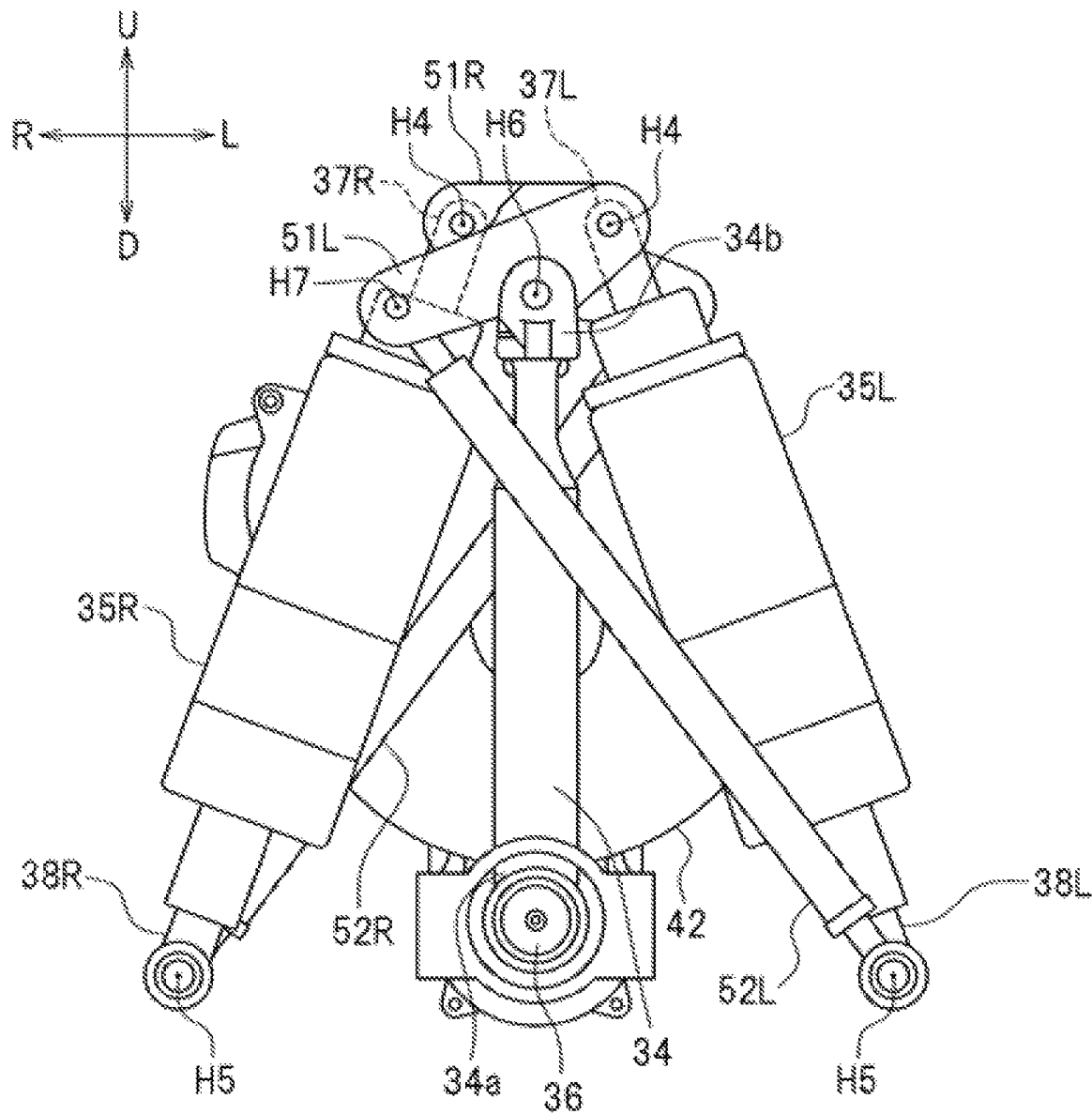
FIG. 5 is a front view of a portion of a leaning mechanism.
Figure 6:
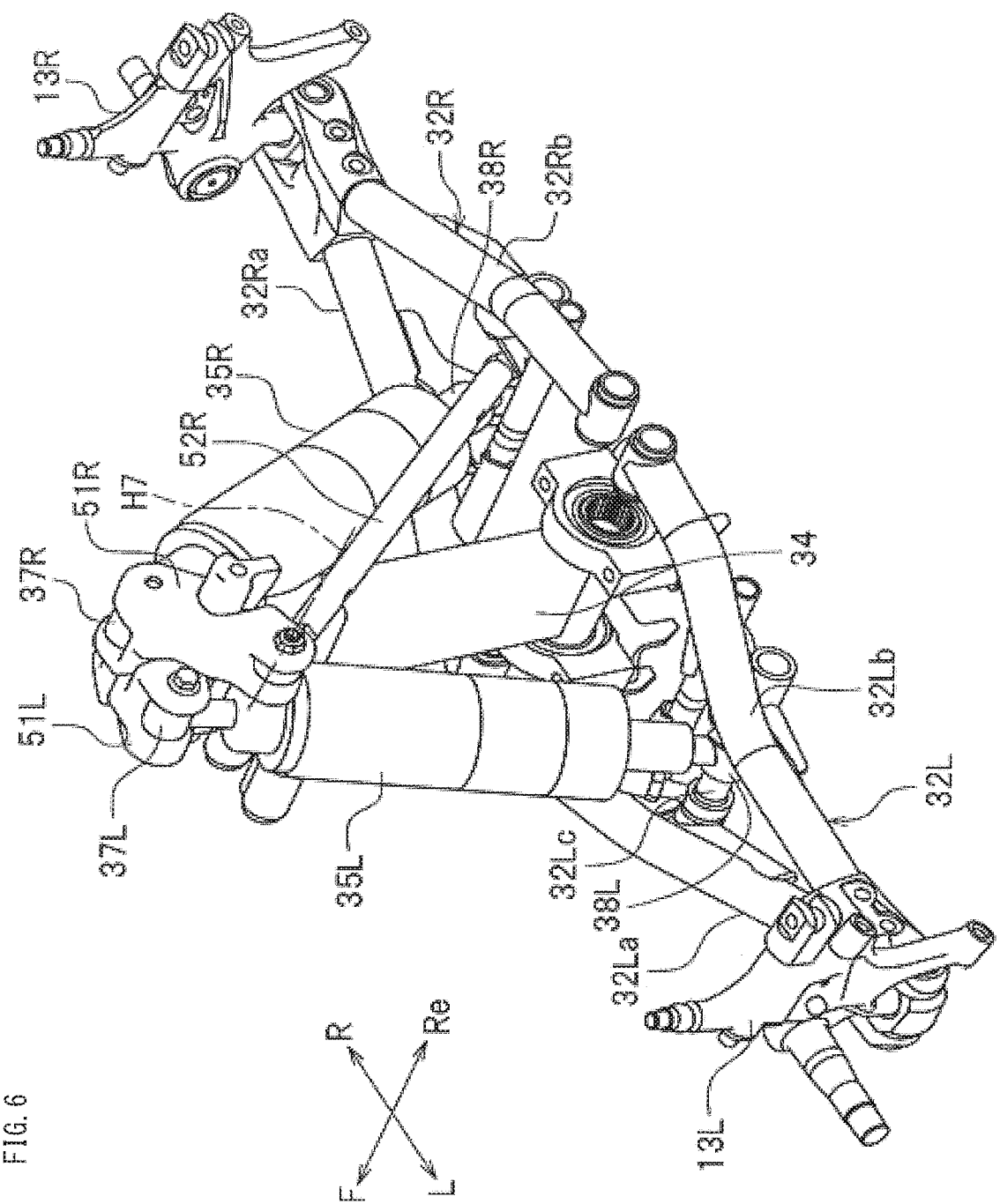
FIG. 6 is a perspective view of a portion of the leaning mechanism.

Referring to FIG. 5, a first left arm 51L and a first right arm 51R are supported by an upper end portion 34b of the center arm 34 in a swingable manner about an axis H6 extending in the front-back direction of the vehicle body 5. Referring to FIG. 6, in this embodiment, the first left arm 51L is disposed at the front side of the first right arm 51R. However, the first left arm 51L may be disposed at the rear side of the first right arm 51R.

A second left arm 52L is connected to the first left arm 51L, and a second right arm 52R is connected to the first right arm 51R. The second left arm 52L and the second right arm 52R are formed into a rod shape. Referring to FIG. 5, an upper end portion of the second left arm 52L is supported by the first left arm 51L in a swingable manner about an axis H7 extending in the front-back direction of the vehicle body 5. A lower end portion of the second left arm 52L is supported by the left lower arm 32L of the left support arm 30L in a swingable manner about an axis H5 extending in the front-back direction of the vehicle body 5. The lower end portion of the second left arm 52L is supported by the crossbar 32Lc of the left lower arm 32L. The lower end portion of the second left arm 52L may be supported by the left upper arm 31L of the left support arm 30L. An upper end portion of the second right arm 52R is supported by the first right arm 51R in a freely swingable manner about an axis H7 extending in the front-back direction of the vehicle body 5. A lower end portion of the second right arm 52R is supported by the right lower arm 32R of the right support arm 30R in a freely swingable manner about an axis H5 extending in the front-back direction of the vehicle body 5. The lower end portion of the second right arm 52R is supported by the crossbar 32Rc of the right lower arm 32R. The lower end portion of the second right arm 52R may be supported by the right upper arm 31R of the right support arm 30R.

Each of the left cushion unit 35L and the right cushion unit 35R is a unit where a spring and a damper are formed into one integral body. The structure of the left cushion unit 35L and the right cushion unit 35R is well known so that the detailed description of the left cushion unit 35L and the right cushion unit 35R is omitted. In the drawing, the illustration of the spring is omitted.

Referring to FIG. 5, the left cushion unit 35L includes a first end portion 38L and a second end portion 37L. The first end portion 38L is supported by the left lower arm 32L of the left support arm 30L in a swingable manner about the axis H5 extending in the front-back direction of the vehicle body 5. The first end portion 38L is supported by the crossbar 32Lc of the left lower arm 32L. However, the first end portion 38L may be supported by the left upper arm 31L of the left support arm 30L. The second end portion 37L is supported by the first left arm 51L in a swingable manner about an axis H4 extending in the front-back direction of the vehicle body 5. In a state where the vehicle 1 is stopped upright on a horizontal plane in a non-steering state (hereinafter referred to as an upright non-steering state), when the vehicle is viewed from the front side, the axis H4 is positioned on the left side of the axis H6, and the axis H7 is positioned on the right side of the axis H6. In the upright non-steering state, when the vehicle is viewed from the front side, either one of the left cushion unit 35L or the second left arm 52L overlaps with the center arm 34. In this embodiment, the second left arm 52L overlaps with the center arm 34. However, the left cushion unit 35L may overlap with the center arm 34.

The right cushion unit 35R includes a first end portion 38R and a second end portion 37R. The first end portion 38R is supported by the right lower arm 32R of the right support arm 30R in a swingable manner about the axis H5 extending in the front-back direction of the vehicle body 5. The first end portion 38R is supported by the crossbar 32Rc of the right lower arm 32R. However, the first end portion 38R may be supported by the right upper arm 31R of the right support arm 30R. The second end portion 37R is supported by the first right arm 51R in a freely swingable manner about an axis H4 extending in the front-back direction of the vehicle body 5. In the upright non-steering state, when the vehicle is viewed from the front side, either one of the right cushion unit 35R or the second right arm 52R overlaps with the center arm 34. In this embodiment, the second right arm 52R overlaps with the center arm 34. However, the right cushion unit 35R may overlap with the center arm 34.

Figure 7:
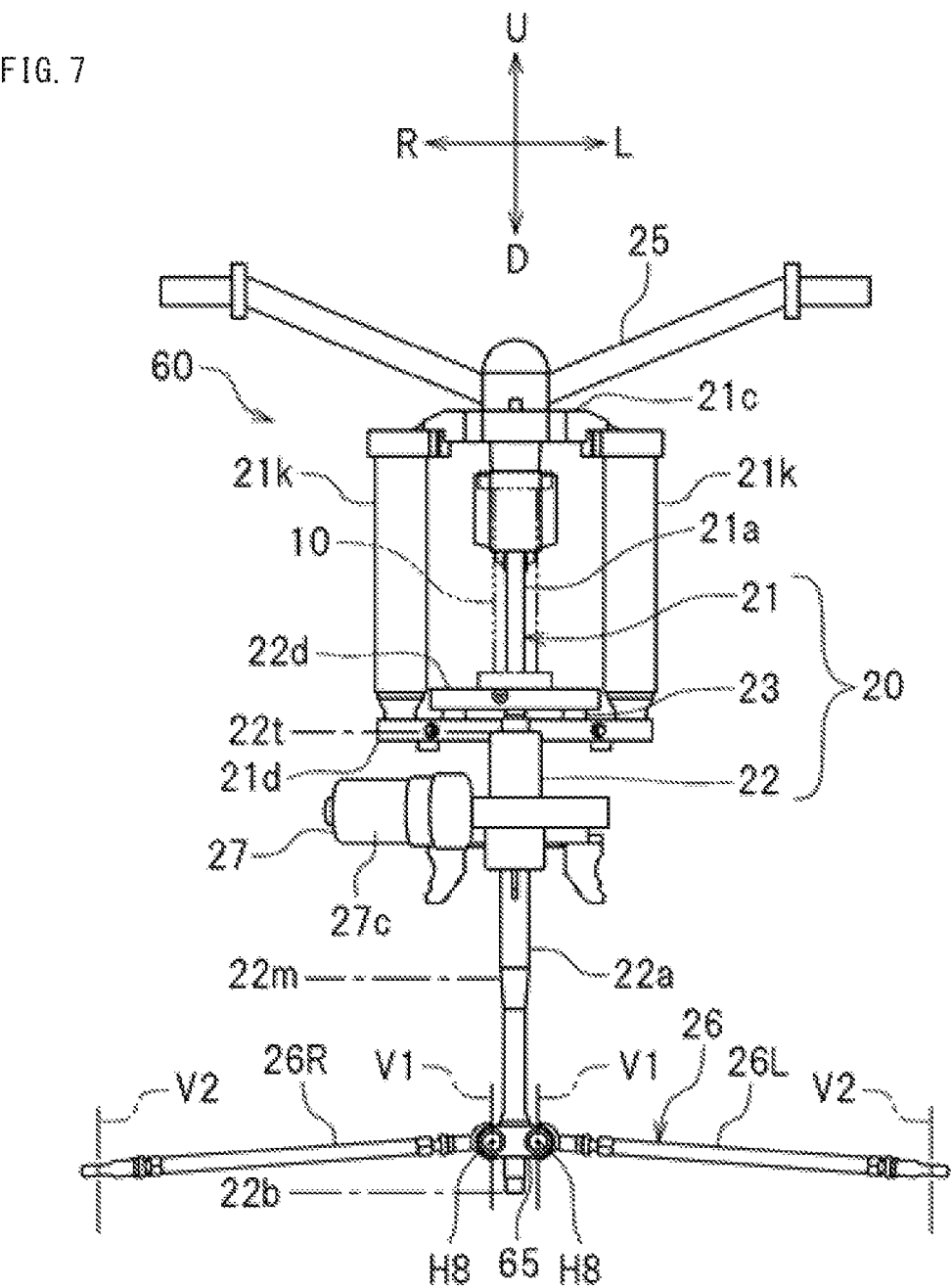
FIG. 7 is a front view of a steering mechanism.
Figure 8:
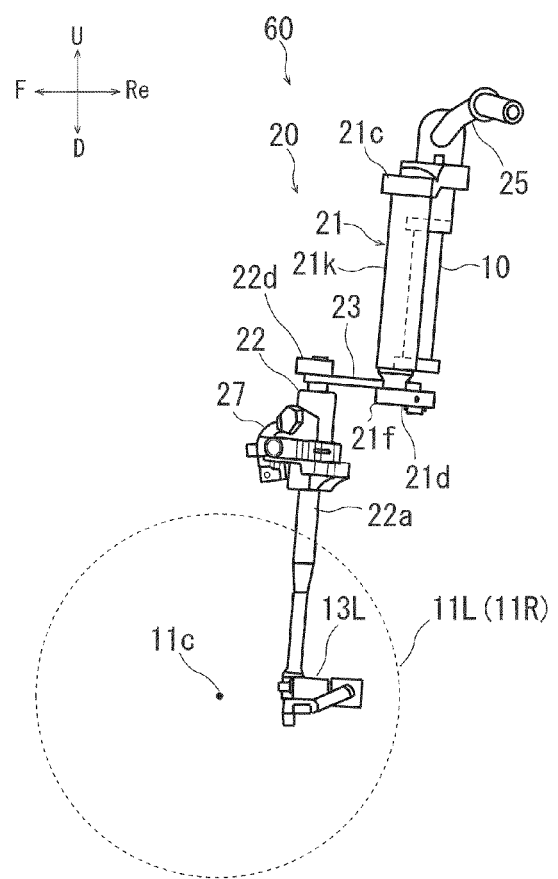
FIG. 8 is a side view of the steering mechanism.
Figure 9:
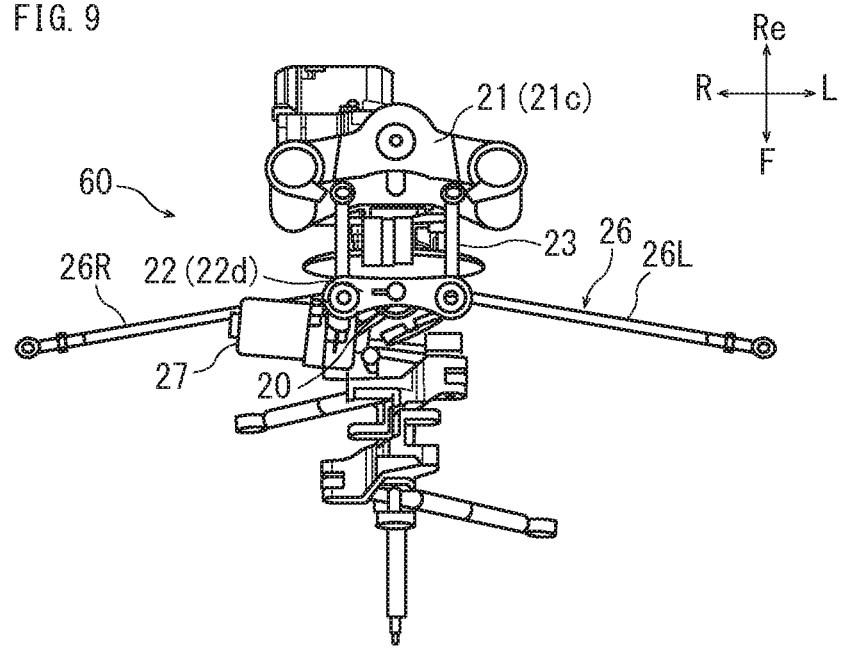
FIG. 9 is a plan view of the steering mechanism.

Next, the steering mechanism 60 is described. Referring to FIG. 7, FIG. 8, and FIG. 9, the steering mechanism 60 includes: a steering shaft 20 rotatably supported by the head pipe 10; a handlebar 25; and a tie rod 26. The handlebar 25 is fixed to the steering shaft 20.

The steering shaft 20 includes a first steering shaft 21, a second steering shaft 22, and a connecting arm 23. The first steering shaft 21 is rotatably supported by the head pipe 10. The second steering shaft 22 is disposed at the front side of the first steering shaft 21 in the front-back direction of the vehicle body 5. The connecting arm 23 connects the first steering shaft 21 and the second steering shaft 22 with each other.

Referring to FIG. 7, the first steering shaft 21 includes a main shaft 21a, side pipes 21k, an upper cross member 21c, and a lower cross member 21d. The main shaft 21a is inserted into the head pipe 10. The side pipes 21k are disposed at the left and right sides of the main shaft 21a. The upper cross member 21c connects an upper end portion of the main shaft 21a and upper end portions of the side pipes 21k with each other. The lower cross member 21d connects a lower end portion of the main shaft 21a and lower end portions of the side pipes 21k with each other. The side pipes 21k, the upper cross member 21c, and the lower cross member 21d are not always necessary, and may be omitted.

The second steering shaft 22 includes a main shaft 22a and a bracket 22d connected to an upper end portion of the main shaft 22a. The connecting arm 23 is formed of a pair of left and right plates extending in the front-back direction of the vehicle body 5. The plates connect the lower cross member 21d and the bracket 22d with each other.

The tie rod 26 includes a left tie rod 26L and a right tie rod 26R. The left tie rod 26L connects the second steering shaft 22 and the left front wheel 11L with each other. The right tie rod 26R connects the second steering shaft 22 and the right front wheel 11R with each other. The left tie rod 26L and the right tie rod 26R are connected to a lower end portion of the second steering shaft 22 by way of a joint member 65. A right end portion of the left tie rod 26L and a left end portion of the right tie rod 26R are supported by the joint member 65 in a swingable manner about axes V1 extending in the up-down direction of the vehicle body 5. The right end portion of the left tie rod 26L and the left end portion of the right tie rod 26R are supported by the joint member 65 in a swingable manner also about axes H8 extending in the front-back direction of the vehicle body 5.

Referring to FIG. 2, a left end portion of the left tie rod 26L is supported by the left knuckle arm 13L in a swingable manner about an axis V2 extending in the up-down direction of the vehicle body 5, and in a swingable manner about an axis H9 extending in the front-back direction of the vehicle body 5. A right end portion of the right tie rod 26R is supported by the right knuckle arm 13R in a swingable manner about an axis V2 extending in the up-down direction of the vehicle body 5, and in a swingable manner about an axis H9 extending in the front-back direction of the vehicle body 5.

Referring to FIG. 7, the steering mechanism 60 further includes an actuator 27 for applying a rotational force to the steering shaft 20. The actuator 27 is mounted on the steering shaft 20. The actuator 27 plays a role of assisting steering performed by an occupant. A torque sensor not shown in the drawing is mounted on the steering shaft 20. The torque sensor is configured to detect a steering force applied to the steering shaft 20 by the occupant. That is, the torque sensor is configured to detect a torque. The actuator 27 is configured to output a driving force corresponding to a torque detected by the above-mentioned torque sensor.

The actuator 27 is mounted on the second steering shaft 22 at a portion above an intermediate position 22m disposed between an upper end 22t and a lower end 22b in the up-down direction of the vehicle body 5. The actuator 27 may be mounted on any of the first steering shaft 21, the connecting arm 23, or the second steering shaft 22. This embodiment shows the case where the actuator 27 is mounted on the second steering shaft 22.

Referring to FIG. 1, the vehicle 1 includes a side stand 67 which maintains the vehicle body 5 in a leaning posture. The side stand 67 is supported by the vehicle body 5. The side stand 67 is disposed at the left side of the vehicle center line CL. The side stand 67 and a motor 27c are respectively disposed at the left side and the right side of the center of the vehicle body frame 5 in the left-right direction of the vehicle body. The side stand 67 and the motor 27c may be respectively disposed at the right side and the left side of the center of the vehicle body 5 in the left-right direction of the vehicle body.

Figure 10:
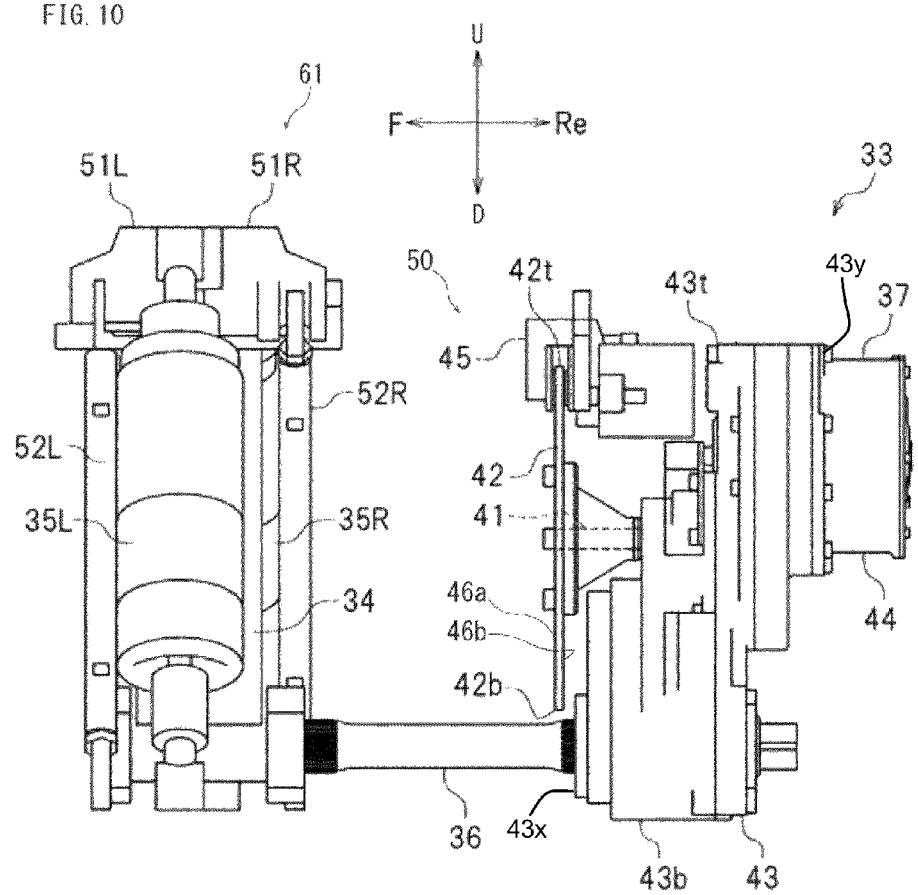
FIG. 10 is a side view of a portion of a leaning drive mechanism and a portion of a leaning brake mechanism.
Figure 11:
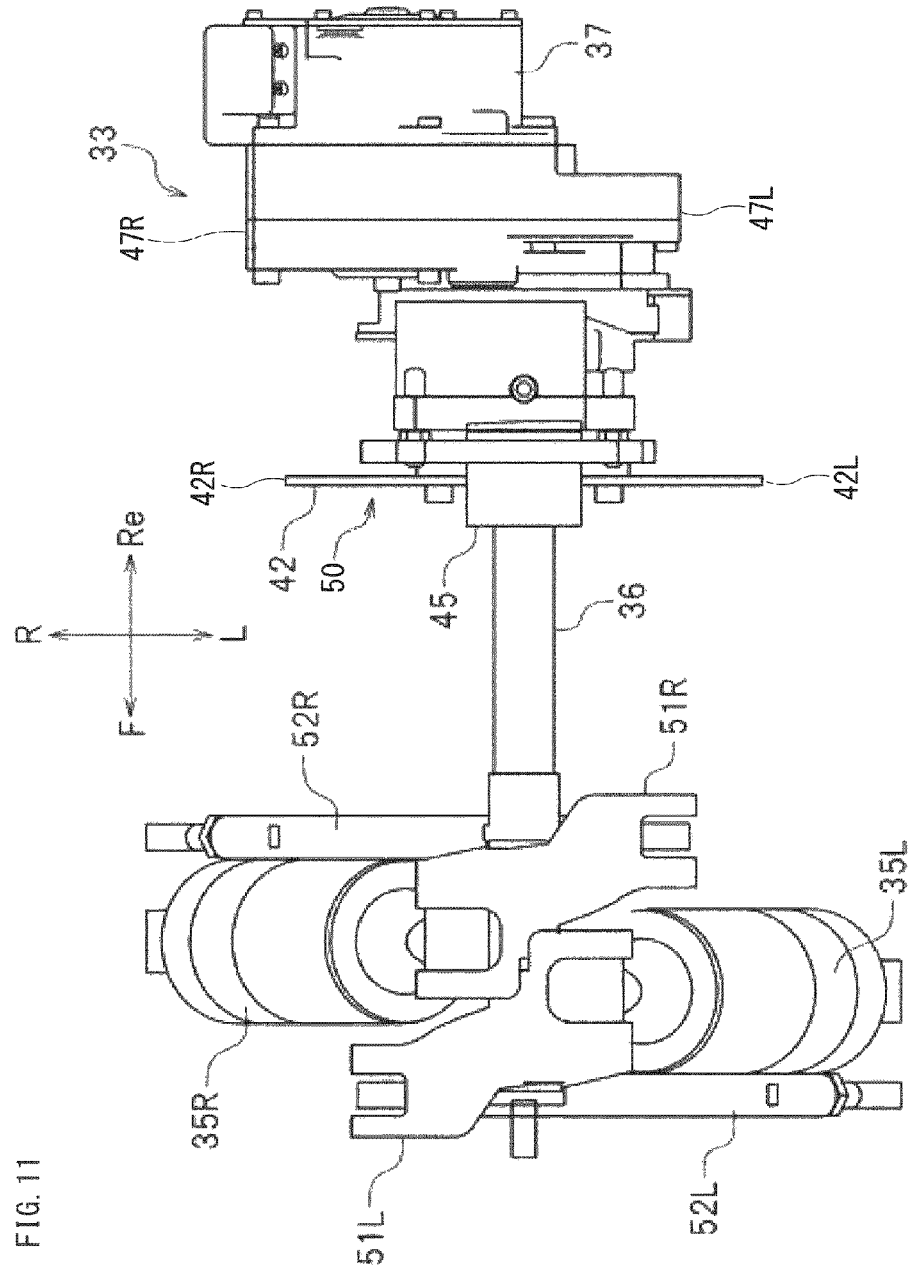
FIG. 11 is a plan view of a portion of the leaning drive mechanism and a portion of the leaning brake mechanism.

Referring to FIG. 10 and FIG. 11, the vehicle 1 according to this embodiment includes a leaning drive mechanism 33. The leaning drive mechanism 33 includes a motor 37.

The motor 37 is a drive source. The motor 37 generates a driving force which causes the left support arm 30L and the right support arm 30R to rotate with respect to the vehicle body 5. To be more specific, the motor 37 applies a rotational force about a first left axis H1L to the left support arm 30L, and applies a rotational force about a first right axis H1R to the right support arm 30R (see FIG. 2). That is, the leaning drive mechanism 33 can change a relative position between the left front wheel 11L and the right front wheel 11R in the up-down direction of the vehicle body 5 corresponding to a lean of the vehicle body 5.

Figure 12:
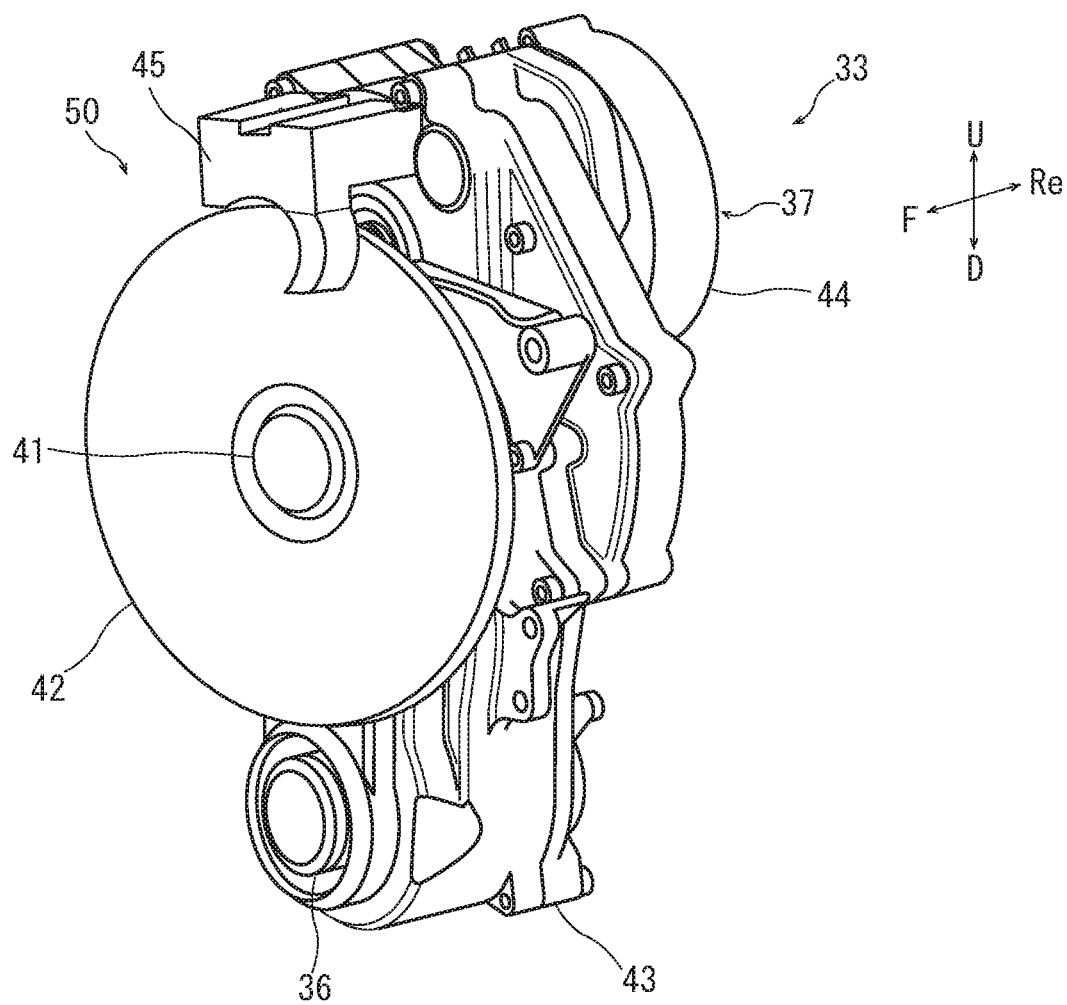
FIG. 12 is a perspective view of a portion of the leaning drive mechanism and a portion of the leaning brake mechanism.
Figure 13:
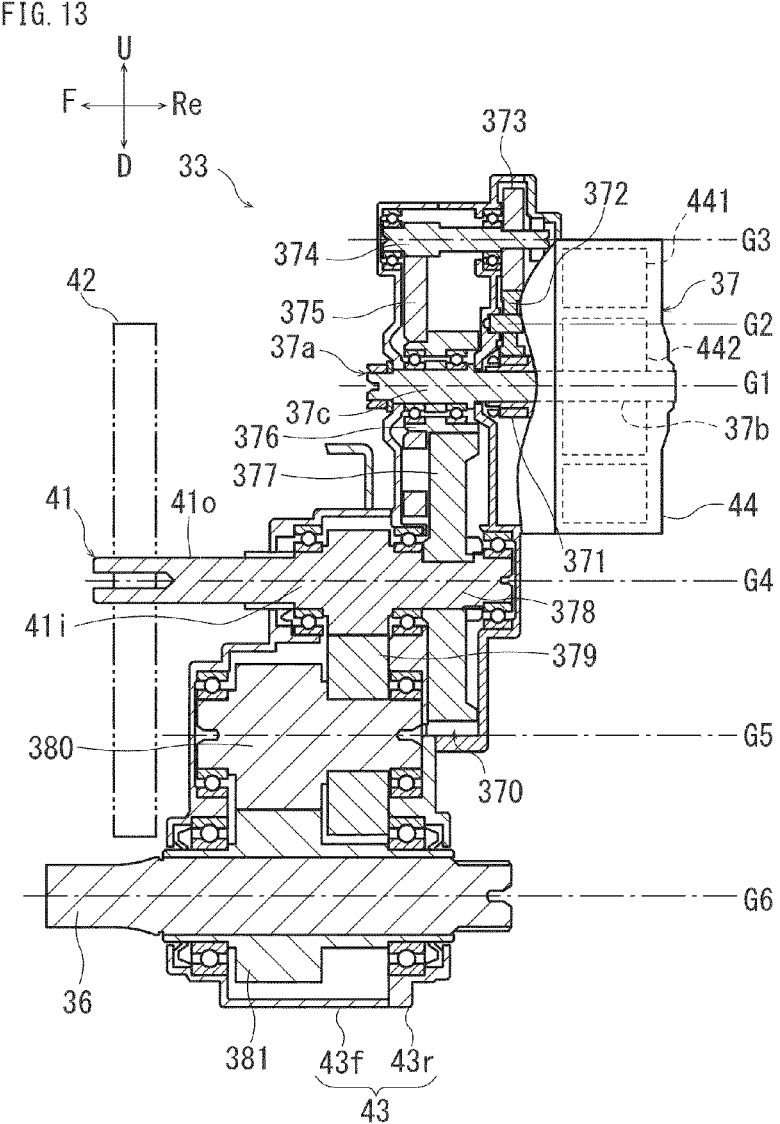
FIG. 13 is a cross-sectional view of a portion of the leaning drive mechanism and a portion of the leaning brake mechanism.

FIG. 12 is a perspective view of a portion of the leaning drive mechanism 33 and a portion of a leaning brake mechanism 50. FIG. 13 is a cross-sectional view of a portion of the leaning drive mechanism 33 and a portion of the leaning brake mechanism. Referring to FIG. 12 and FIG. 13, the motor 37 includes a motor casing 44, a stator 441, and a rotor 442. The stator 441 and the rotor 442 are disposed in the motor casing 44.

The leaning drive mechanism 33 includes a plurality of speed reduction gears 370, a plurality of rotary shafts 37a, 41, 36, and a gear casing member 43. Axes of rotation of the plurality of speed reduction gears 370 and the plurality of rotary shafts 37a, 41, 36 are set so as to extend along the front-back direction of the vehicle body 5. The plurality of speed reduction gears 370 decelerate a driving force generated by the motor 37, and transmit the driving force to the left support arm 30L and the right support arm 30R.

The plurality of speed reduction gears 370 are disposed in the gear casing member 43. The plurality of speed reduction gears 370 include a first gear 371, intermediate gears 372 to 380, and a final gear 381. The plurality of speed reduction gears 370 are connected to the motor 37. Accordingly, the plurality of speed reduction gears 370 can transmit a driving force of the motor 37.

The first gear 371 is mounted on the motor 37, and is fixed to a second motor shaft portion 37c. The final gear 381 is mounted on the connecting shaft 36. The intermediate gears 372 to 380 are disposed between the first gear 371 and the final gear 381. A rotation of the first gear 371 is transmitted to the gears in the order of the intermediate gears 372, 373, 374, 375, 376, 377, 378, 379, 380, and the final gear 381. Rotational speed reduces as the rotation of the first gear 371 is transmitted toward the final gear 381. In this embodiment, two or more intermediate gears are used. However, one intermediate gear may be used.

The plurality of rotary shafts include the motor shaft 37a, the brake shaft 41, and the connecting shaft 36. The motor shaft 37a is fixed to the rotor 442. The motor shaft 37a includes a first motor shaft portion 37b and a second motor shaft portion 37c. The first motor shaft portion 37b is disposed outside the gear casing member 43. The second motor shaft portion 37c is disposed inside the gear casing member 43.

The brake shaft 41 is mounted on the intermediate gear 378. As described later, a brake disc 42 is connected to the brake shaft 41.

Referring to FIG. 10, one end portion of the connecting shaft 36 is mounted on the final gear 381. The other end portion of the connecting shaft 36 is connected to the center arm 34. A driving force of the motor 37 is transmitted to the connecting shaft 36 by means of the plurality of speed reduction gears 370. The connecting shaft 36 transmits the driving force to the center arm 34. With such a configuration, the left support arm 30L and the right support arm 30R can be rotated with respect to the vehicle body 5.

Referring to FIG. 12 and FIG. 13, the motor shaft 37a, the brake shaft 41, and the connecting shaft 36 extend forward from the gear casing member 43 in the front-back direction of the vehicle body 5. The connecting shaft 36 is disposed outside the brake disc 42 in the radial direction. In this embodiment, the connecting shaft 36 is disposed at the down side of the brake disc 42.

The brake shaft 41 may be mounted on any of the first gear 371, the intermediate gears 372 to 380, or the final gear 381. In this embodiment, the brake shaft 41 is mounted on the intermediate gear 378. The brake shaft 41 and the intermediate gear 378 may be separated components. This embodiment shows the case where the brake shaft 41 and the intermediate gear 378 are formed into one integral body. The brake shaft 41 includes: a first brake shaft portion 41i disposed inside the gear casing member 43; and a second brake shaft portion 41o disposed outside the gear casing member 43. The brake shaft 41 projects outside from the inside of the gear casing member 43.

Axes of the first gear 371, the intermediate gears 372 to 380, and the final gear 381 extend in the vehicle front-back direction. Axes of the motor shaft 37a, the first gear 371, the intermediate gear 375, and the intermediate gear 376 agree with each other. Axes of the intermediate gears 373 and 374 agree with each other. Axes of the intermediate gears 377 and 378 agree with each other. Axes of the intermediate gears 379 and 380 agree with each other. Hereinafter, the axes of the motor shaft 37a, the first gear 371, and the intermediate gears 375 and 376 are denoted by a reference character G1. The axis of the intermediate gear 372 is denoted by a reference character G2. The axes of the intermediate gears 373 and 374 are denoted by a reference character G3. The axes of the intermediate gears 377 and 378 are denoted by a reference character G4. The axes of the intermediate gears 379 and 380 are denoted by a reference character G5. The axis of the final gear 381 is denoted by a reference character G6.

Figure 14:
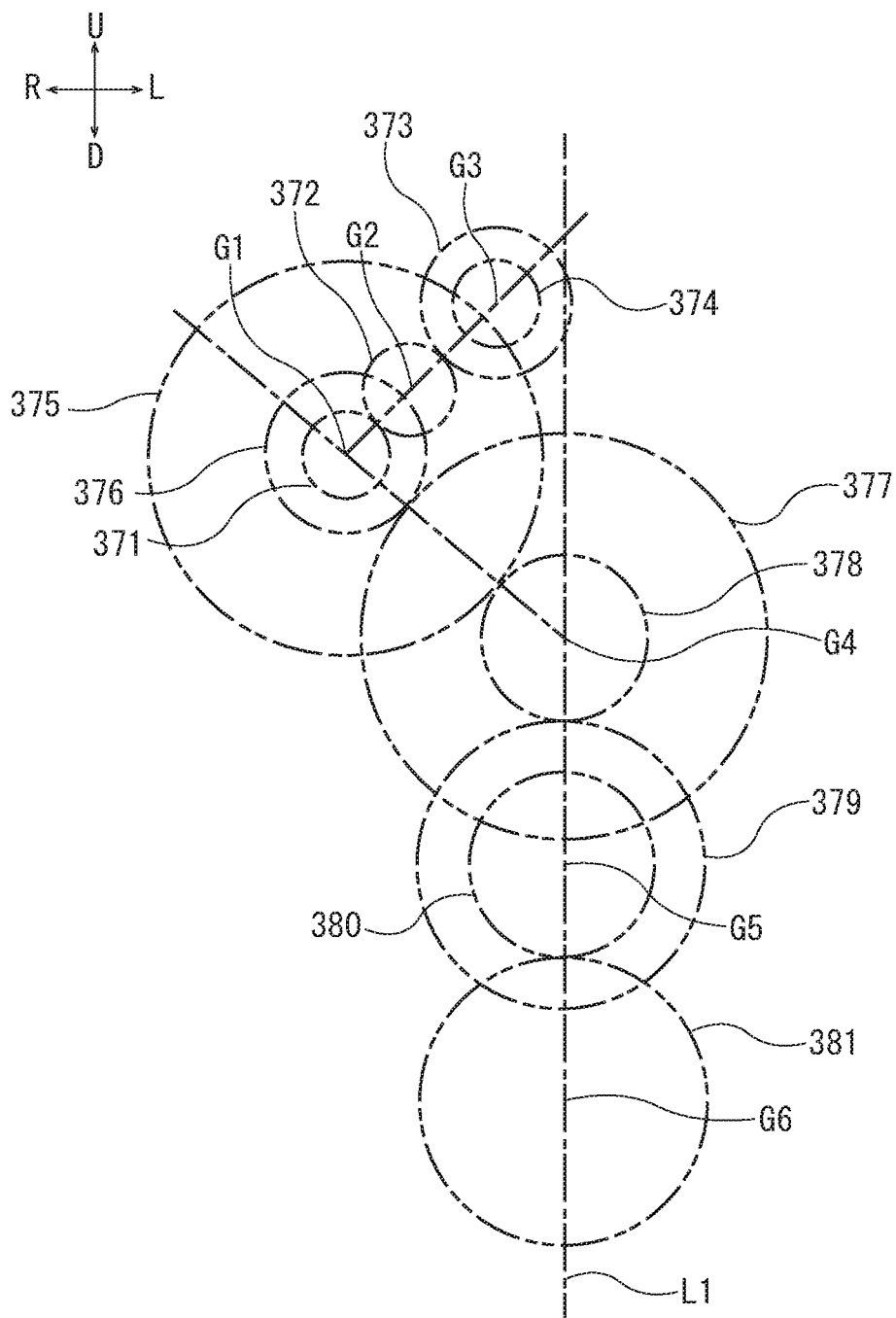
FIG. 14 is a view describing positions of axes of speed reduction gears when the vehicle is viewed from the front side.

FIG. 14 is a view showing positions of the axes G1 to G6 when the vehicle body 5 is viewed from the front side in the front-back direction of the vehicle body 5. In other words, FIG. 14 is a view describing the positions of the axes G1 to G6 when the vehicle is viewed from the front side. Referring to FIG. 14, the axes G4, G5, and G6 are arranged in the vehicle up-down direction. The axes G4, G5, and G6 are positioned on a first straight line L1 extending in the vehicle up-down direction. The axes G1, G2, and G3 are not positioned on the first straight line L1.

Referring to FIG. 13, the gear casing member 43 includes a plurality of casing pieces. To be more specific, the gear casing member 43 includes a front casing piece 43f and a rear casing piece 43r. The front casing piece 43f and the rear casing piece 43r are arranged in the front-back direction of the vehicle body 5. At least portions of the plurality of rotary shafts 37a, 41 and 36 which are respectively connected to the plurality of speed reduction gears 370 and the plurality of speed reduction gears 370 are accommodated in the gear casing member 43.

Figure 15:
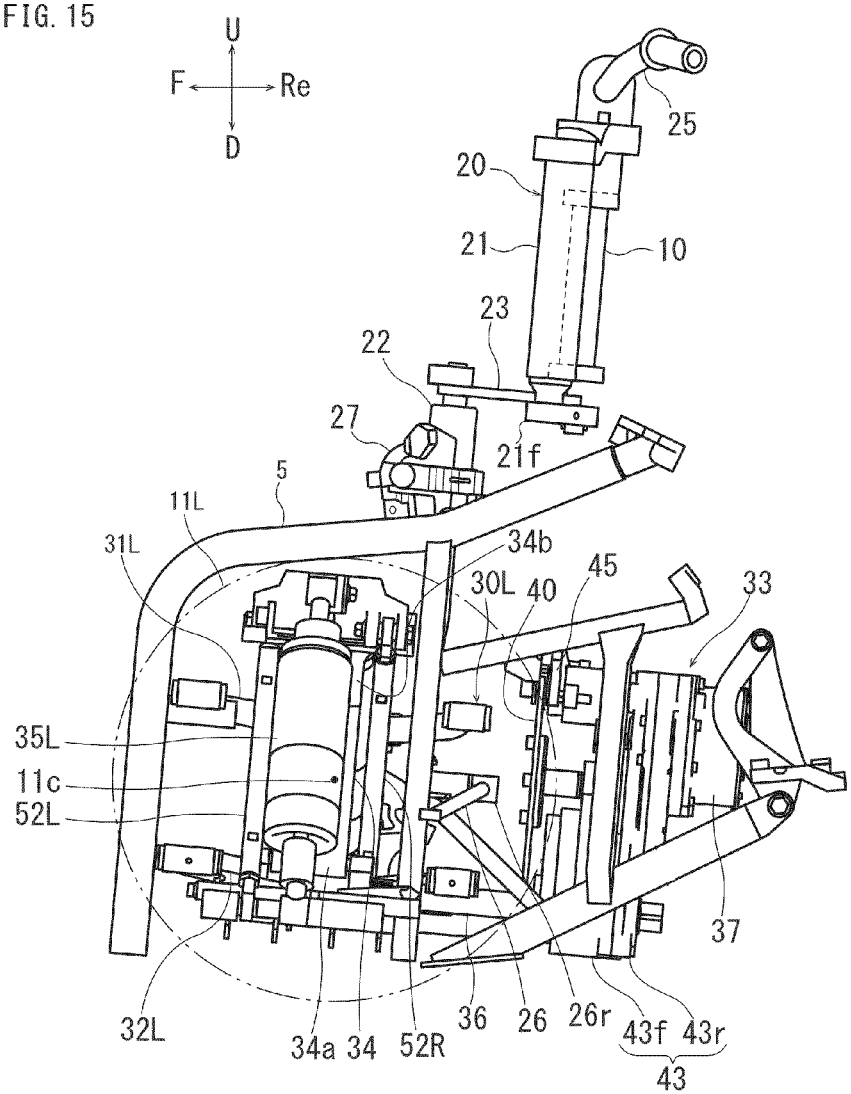
FIG. 15 is a side view of a portion of the leaning vehicle.
Figure 16:
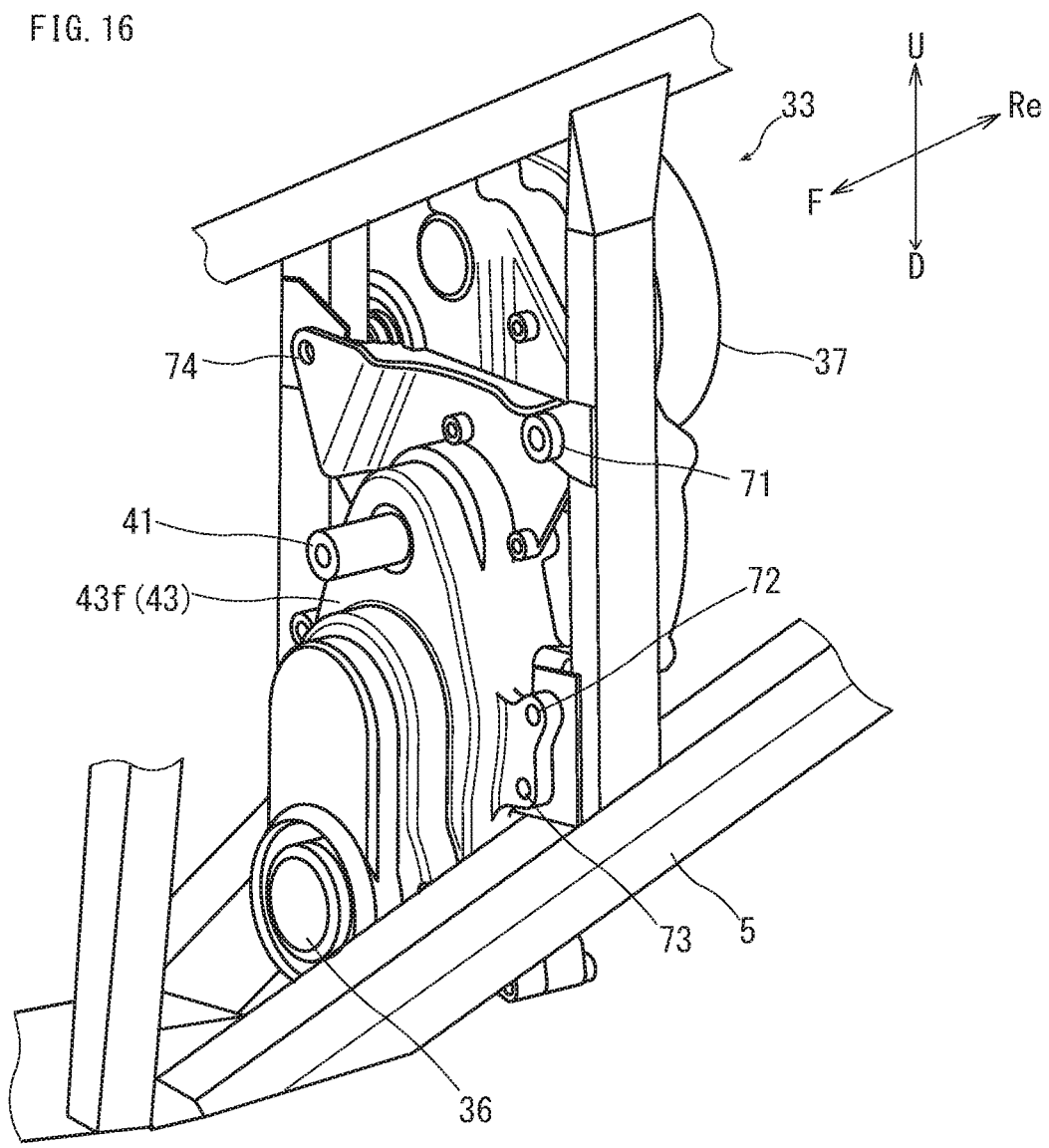
FIG. 16 is a perspective view showing the leaning drive mechanism supported by the vehicle body.

Referring to FIG. 15 and FIG. 16, the gear casing member 43 is supported by the vehicle body 5. In FIG. 16, the leaning brake mechanism is omitted. The front casing piece 43f is supported by the vehicle body 5. The rear casing piece 43r is not supported by the vehicle body 5. The rear casing piece 43r is mounted on the front casing piece 43f. Accordingly, the rear casing piece 43r is supported by the vehicle body 5 by way of the front casing piece 43f. To be more specific, the front casing piece 43f is supported by the vehicle body 5 at a plurality of support portions 71 to 74. A support method may be bolt fastening, for example.

At least a portion of the leaning drive mechanism 33 is disposed at the rear side of the left support arm 30L and the right support arm 30R in the front-back direction of the vehicle body 5. In this embodiment, the whole leaning drive mechanism 33 is disposed at the rear side of the left support arm 30L and the right support arm 30R in the front-back direction of the vehicle body 5. At least a portion of the leaning drive mechanism 33 is disposed at the rear side of a center 11c of the left front wheel 11L and the right front wheel 11R in the front-back direction of the vehicle body 5. In this embodiment, the whole leaning drive mechanism 33 is disposed at the rear side of the center 11c of the left front wheel 11L and the right front wheel 11R in the front-back direction of the vehicle body 5. At least a portion of the leaning drive mechanism 33 is disposed at the rear side of a rear end 26r of the tie rod 26 in the front-back direction of the vehicle body 5. At least a portion of the leaning drive mechanism 33 is disposed at the rear side of a front end 21f of the first steering shaft 21 in the front-back direction of the vehicle body 5.

The center arm 34 is disposed at the front side of the leaning drive mechanism 33. As described previously, the center arm 34 includes: the lower end portion 34a supported by the vehicle body 5; and the upper end portion 34b to which the left cushion unit 35L and the right cushion unit 35R are connected. Referring to FIG. 5, the upper end portion 34b is connected to the left cushion unit 35L by way of the first left arm 51L, and is connected to the right cushion unit 35R by way of the first right arm 51R. The center arm 34 is formed into a shape extending in the vehicle up-down direction from the lower end portion 34a to the upper end portion 34b.

Referring to FIG. 10, the leaning brake mechanism 50 includes the brake disc 42 and a brake caliper 45. The brake disc 42 is a brake member. The brake caliper 45 is a resistance applying member.

Referring to FIG. 13, the brake disc 42 is connected to the brake shaft 41 which rotates at a reduced rotational speed. The brake shaft 41 is mounted on the intermediate gear 378 which rotates in an interlocking manner with the left support arm 30L and the right support arm 30R. Accordingly, the brake disc 42 rotates in an interlocking manner with the left support arm 30L and the right support arm 30R by way of the brake shaft 41 connected to the brake disc 42.

The brake disc 42 is rotatable with respect to the gear casing member 43. The brake shaft 41 to which the brake disc 42 is connected is also rotatable with respect to the gear casing member 43. The brake shaft 41 and the brake disc 42 are supported by the vehicle body 5 by way of the gear casing member 43. An axis of rotation of the brake disc 42 is set so as to extend along the front-back direction of the vehicle body 5.

Referring to FIG. 10, the brake disc 42 is disposed at the front side of the gear casing member 43 in the front-back direction of the vehicle body 5. The gear casing member 43 is disposed at the front side of the motor casing 44 in the front-back direction of the vehicle body 5. An upper end 42t of the brake disc 42 is disposed at a position lower than an upper end 43t of the gear casing member 43 in the up-down direction of the vehicle body 5. A lower end 42b of the brake disc 42 is disposed at a position higher than a lower end 43b of the gear casing member 43 in the up-down direction of the vehicle body 5.

The arrangement of the brake disc 42 is not limited to the above-mentioned description. At least one of a front end 46a or a rear end 46b of the brake disc 42 may be positioned between the front end 43x and the rear end 43y of the gear casing member 43 in the front-back direction of the vehicle body 5.

Referring to FIG. 11, at least one of a left end 42L or a right end 42R of the brake disc 42 may be positioned between a left end 47L and a right end 47R of the gear casing member 43 in the left-right direction of the vehicle body 5.

Referring to FIG. 10, the brake caliper 45 can hold the brake disc 42. By holding the brake disc 42 with the brake caliper 45, the brake caliper 45 applies a resistance to a motion of the brake disc 42 with respect to the vehicle body 5. By applying a resistance as described above, the brake disc 42 restricts a rotation of the motor 37. When the rotation of the motor 37 is restricted, a driving force transmitted to the left support arm 30L and the right support arm 30R from the motor 37 is restricted. In other words, the leaning brake mechanism 50 applies a resistance to a rotation of the left support arm 30L and the right support arm 30R with respect to the vehicle body 5. With such a configuration, an upright state or a lean state of the vehicle body 5, the left front wheel 11L and the right front wheel 11R can be maintained.

The brake caliper 45 is supported by the vehicle body 5. As viewed in the axial direction of the brake shaft 41, the brake shaft 41 is disposed between the brake caliper 45 and the connecting shaft 36. The brake caliper 45 is disposed at the up side of the brake shaft 41, and the connecting shaft 36 is disposed at the down side of the brake shaft 41.

A position where the brake caliper 45 applies a resistance to the brake disc 42 is not particularly limited. For example, the brake caliper 45 applies a resistance to the brake caliper 45 at a position higher than the motor shaft 37a in the up-down direction of the vehicle body 5.

As has been described heretofore, according to the vehicle 1 of this embodiment, the brake disc 42 is integrally formed with the leaning drive mechanism 33. Accordingly, a support structure for supporting the leaning brake mechanism 50 and the leaning drive mechanism 33 from the vehicle body 5 can be simplified. For this reason, a size increase of the vehicle body 5 around the leaning mechanism 61 can be suppressed. As a result, even when the vehicle 1 includes the leaning drive mechanism 33 and the leaning brake mechanism 50, a size increase of the vehicle 1 can be suppressed.

Next, other embodiments of the vehicle 1 are described.

Second Embodiment

Figure 17:
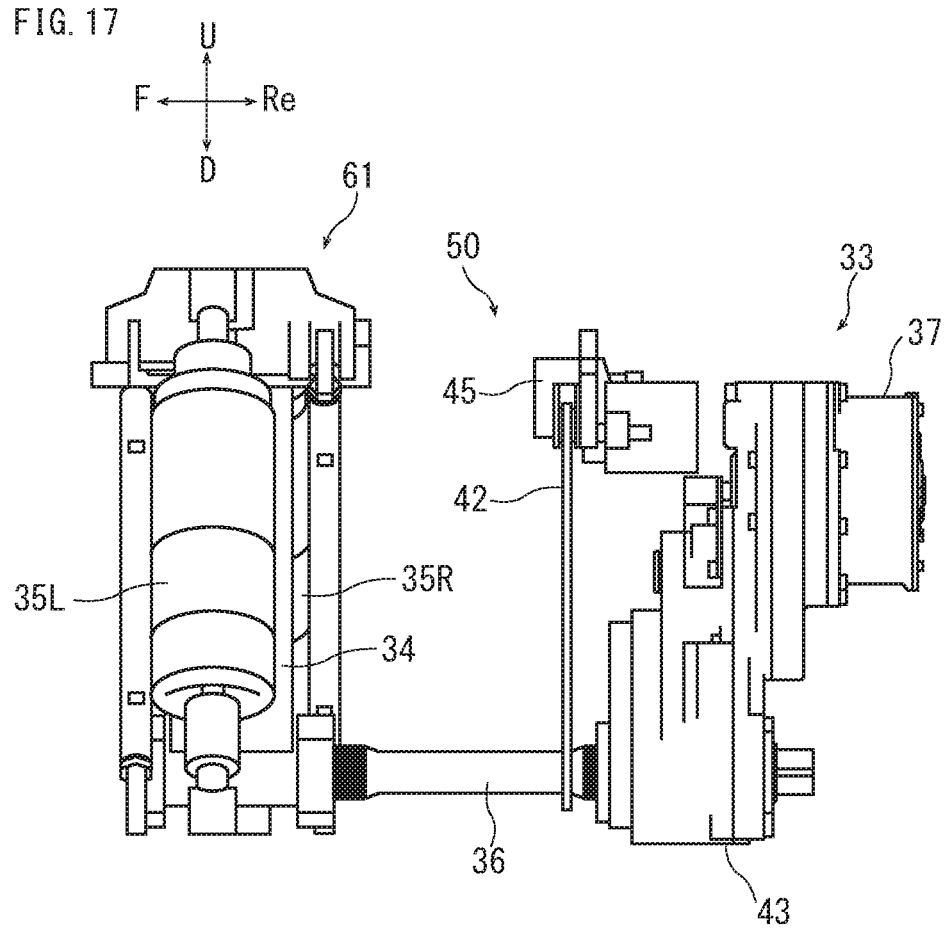
FIG. 17 is a side view of a portion of a leaning drive mechanism and a portion of a leaning brake mechanism in a second embodiment.
Figure 18:
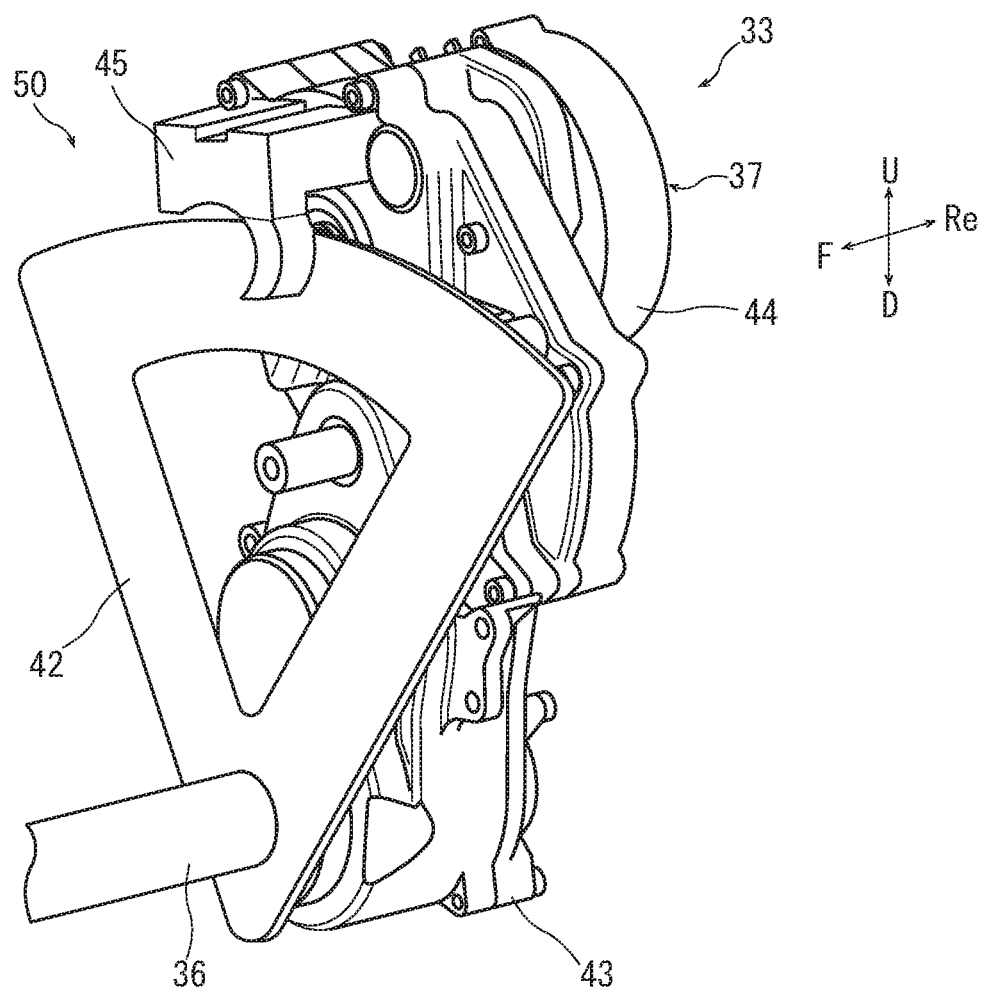
FIG. 18 is a perspective view of a portion of the leaning drive mechanism and a portion of the leaning brake mechanism in the second embodiment.

FIG. 17 is a side view of a portion of a leaning drive mechanism and a portion of a leaning mechanism in a second embodiment. FIG. 18 is a perspective view of a portion of the leaning drive mechanism and a portion of the leaning brake mechanism in the second embodiment. FIG. 19 is a cross-sectional view of a portion of the leaning drive mechanism and a portion of the leaning brake mechanism in the second embodiment.

Referring to FIG. 17 to FIG. 19, the second embodiment differs from the first embodiment with respect to a point that a brake disc 42 is connected to a connecting shaft 36. Other configurations of a vehicle 1 of the second embodiment are substantially equal to the corresponding configurations in the first embodiment. The brake disc 42 has a fan shape. With such a configuration, the brake disc 42 minimally interferes with a portion of a vehicle body 5 disposed around the brake disc 42. The connecting shaft 36 is connected to a motor 37. The connecting shaft 36 is connected to a leaning mechanism 61. The connecting shaft 36 transmits a driving force of the motor 37 to a left support arm 30L and a right support arm 30R. Accordingly, the connecting shaft 36 rotates in an interlocking manner with the left support arm 30L and the right support arm 30R.

The brake disc 42 is connected to the connecting shaft 36 which rotates in an interlocking manner with the left support arm 30L and the right support arm 30R. Accordingly, the brake disc 42 rotates in an interlocking manner with the left support arm 30L and the right support arm 30R. When a brake caliper 45 applies a resistance to the brake disc 42, a rotation of the left support arm 30L and the right support arm 30R with respect to the vehicle body 5 is restricted.

The brake disc 42 is connected to the connecting shaft 36 of the leaning drive mechanism 33. Accordingly, the brake disc 42 is integrally formed with the leaning drive mechanism 33. For this reason, as described above, a support structure for supporting the leaning brake mechanism 50 and the leaning drive mechanism 33 from the vehicle body 5 can be simplified. Accordingly, a size increase of the vehicle body 5 around the leaning mechanism 61 can be suppressed. As a result, even when the vehicle 1 includes the leaning drive mechanism 33 and the leaning brake mechanism 50, a size increase of the vehicle 1 can be suppressed.

Third Embodiment

FIG. 20 is a cross-sectional view of a portion of a leaning drive mechanism and a portion of a leaning brake mechanism in a third embodiment. Referring to FIG. 20, the third embodiment differs from the above-mentioned embodiments with respect to a point that a brake disc 42 is connected to a motor shaft 37a. A shape of the brake disc 42 may be a fan shape or a disc shape. The motor shaft 37a is connected to a motor 37. A connecting shaft 36 is connected to the leaning mechanism 61. The motor shaft 37a transmits a driving force of the motor 37 to a left support arm 30L and a right support arm 30R. Accordingly, the motor shaft 37a rotates in an interlocking manner with the left support arm 30L and the right support arm 30R.

The brake disc 42 is connected to the motor shaft 37a which rotates in an interlocking manner with the left support arm 30L and the right support arm 30R. Accordingly, the brake disc 42 rotates in an interlocking manner with the left support arm 30L and the right support arm 30R. When a brake caliper 45 applies a resistance to the brake disc 42, a rotation of the left support arm 30L and the right support arm 30R with respect to a vehicle body 5 is restricted.

The brake disc 42 is connected to the motor shaft 37a of the leaning drive mechanism 33. Accordingly, the brake disc 42 is integrally formed with the leaning drive mechanism 33. Accordingly, as described above, a support structure for supporting the leaning brake mechanism 50 and the leaning drive mechanism 33 from the vehicle body 5 can be simplified. For this reason, a size increase of the vehicle body 5 around the leaning mechanism 61 can be suppressed. As a result, even when a vehicle 1 includes the leaning drive mechanism 33 and the leaning brake mechanism 50, a size increase of the vehicle 1 can be suppressed.

Fourth Embodiment

FIG. 21 is a view describing positions of axes of speed reduction gears in a fourth embodiment when a vehicle is viewed from the front side. Referring to FIG. 21, the fourth embodiment differs from the above-mentioned embodiments with respect to a point that a brake disc 42 is connected to a third brake shaft 46 which differs from a motor shaft 37a, a brake shaft 41, and a connecting shaft 36.

The third brake shaft 46 is connected to a second intermediate gear 400. The second intermediate gear 400 is connected to an intermediate gear 378. Accordingly, the third brake shaft 46 rotates in an interlocking manner with a left support arm 30L and a right support arm 30R.

The brake disc 42 is connected to the third brake shaft 46 which rotates in an interlocking manner with the left support arm 30L and the right support arm 30R. Accordingly, the brake disc 42 rotates in an interlocking manner with the left support arm 30L and the right support arm 30R. When a brake caliper 45 applies a resistance to the brake disc 42, a rotation of the left support arm 30L and the right support arm 30R with respect to a vehicle body 5 is restricted.

The brake disc 42 is connected to the third brake shaft 46 of the leaning drive mechanism 33 so that the brake disc 42 is integrally formed with the leaning drive mechanism 33. Accordingly, as described above, a support structure for supporting the leaning brake mechanism 50 and the leaning drive mechanism 33 from the vehicle body 5 can be simplified. For this reason, a size increase of the vehicle body 5 around the leaning mechanism 61 can be suppressed. As a result, even when a vehicle 1 includes the leaning drive mechanism 33 and the leaning brake mechanism 50, a size increase of the vehicle 1 can be suppressed.

In short, it is sufficient for the brake disc 42 to be connected to one of the plurality of rotary shafts to which a driving force of a motor 37 is transmitted and which rotates in an interlocking manner with the left support arm 30L and the right support arm 30R.

The embodiments of the present invention have been described heretofore. However, it is needless to say that the present invention can be carried out in various embodiments, and is not limited to the above-mentioned embodiments.

The vehicle body of the present invention includes a member of the leaning vehicle which mainly receives a stress. The vehicle body may include a frame formed by combining a plurality of parts or a frame formed by integral molding. A material for forming the vehicle body may be metal such as aluminum or iron, a resin such as CFRP, or a combination of these materials. Further, the vehicle body may have a monocoque structure where the vehicle body is formed of an appearance component of a vehicle, or a semi-monocoque structure where a portion of the vehicle body also functions as an appearance component of the vehicle.

The leaning vehicle of the present invention includes: the left wheel disposed at the left side of the center of the vehicle body in the left-right direction of the vehicle body; and the right wheel disposed at the right side of the center of the vehicle body in the left-right direction of the vehicle body and on the right side of the left wheel. The left wheel and the right wheel are arranged in the left-right direction of the vehicle body. The left wheel may be a left front wheel, and the right wheel may be a right front wheel. In this case, the leaning vehicle includes the rear wheel disposed at the rear side of the left front wheel and the right front wheel in the front-back direction of the vehicle body. The rear wheel may be one rear wheel disposed at the center of the vehicle body in the left-right direction of the vehicle body. The rear wheel may be formed of two rear wheels arranged in the left-right direction of the vehicle body. The left wheel may be a left rear wheel, and the right wheel may be a right rear wheel. In this case, the leaning vehicle includes the front wheel disposed at the front side of the left rear wheel and the right rear wheel in the front-back direction of the vehicle body. The front wheel may be one front wheel disposed at the center of the vehicle body in the left-right direction of the vehicle body. The front wheel may be formed of two front wheels arranged in the left-right direction of the vehicle body. The left wheel may be a left steerable wheel, and the right wheel may be a right steerable wheel.

The support arm member of the present invention may be used in a parallelogram type leaning mechanism. The support arm member may be a support arm member where a left portion of the support arm member supports a left steerable front wheel, a right portion of the support arm member supports a right steerable front wheel, and an intermediate portion of the support arm member is rotatably supported by the vehicle body.

The support arm member of the present invention may be used in a double wishbone type leaning mechanism. The support arm member may be a left support arm member where a left portion of the support arm member supports a left steerable front wheel, and a right portion of the support arm member is supported by the vehicle body. The support arm member may be a right support arm member where a right portion of the support arm member supports a right steerable front wheel, and a left portion of the support arm member is supported by the vehicle body.

The support arm member of the present invention may be used in a trailing arm type leaning mechanism. The support arm member may be a left support arm member where a left front portion of the support arm member supports a left steerable front wheel, and a left rear portion of the support arm member is supported by the vehicle body. The support arm member may be a right support arm member where a right front portion of the support arm member supports a right steerable front wheel, and a right rear portion of the support arm member is supported by the vehicle body.

The leaning mechanism of the present invention may be a double wishbone type leaning mechanism. The leaning mechanism may be a parallelogram type leaning mechanism. The leaning mechanism may be a trailing arm type leaning mechanism. The present invention is applicable to a mechanism having a function of causing a vehicle body, a left steerable front wheel and a right steerable front wheel to lean leftward of a vehicle when the vehicle turns left, and a function of causing the vehicle body, a left wheel and a right wheel to lean rightward of the vehicle when the vehicle turns right.

The drive source of the leaning drive mechanism of the present invention may be an electric motor. The drive source may be a hydraulic motor. The drive source may be a hydraulic cylinder.

The connecting shaft forming one of the rotary shafts of the present invention may be connected to the left support arm or the right support arm. It is sufficient for the connecting shaft of the present invention to be connected to at least one of the left support arm, the right support arm mechanism, or a left-right arm connection mechanism.

The brake member of the present invention may be a brake disc of a disc brake system. The brake member may be a brake drum of a drum brake system. The brake member may be a rotatable member of a brake system other than the above-mentioned brake systems.

The brake member of the present invention may be connected to a rotary shaft of the leaning drive mechanism. In this case, the brake member may be directly fixed to the rotary shaft. Alternatively, the brake member may be fixed to another shaft member fixed to the rotary shaft.

The brake member of the present invention may be connected to a gear of the leaning drive mechanism. In this case, the brake member may be directly fixed to the gear of the leaning drive mechanism. Alternatively, the brake member may be fixed to another gear which meshes with the gear of the leaning mechanism and another shaft member fixed to the above-mentioned another gear.

The resistance applying member of the present invention may be a pad member of a disc brake system. The brake member may be a shoe member of a drum brake system. The brake member may be a member of a brake system other than the above-mentioned brake systems, and may also be a member which comes into contact with a rotatable member thus applying a resistance to the rotatable member. A magnitude of a resistance which the resistance applying member applies can be set corresponding to a required magnitude. A magnitude of a resistance which the resistance applying member applies may be zero. In other words, there may be a case where the resistance applying member does not apply a resistance. A magnitude of a resistance which the resistance applying member applies may be set to a magnitude at which a lean of the vehicle body can be suppressed.

The resistance applying member of the present invention may be supported by the vehicle body. The resistance applying member of the present invention may be supported by a member other than the vehicle body. For example, the resistance applying member may be supported by the gear casing member.

The leaning brake mechanism of the present invention may be a disc brake system. The leaning brake mechanism may be a drum brake system. The leaning brake mechanism may be a brake system other than the above-mentioned brake systems.

A rotation in the present invention is not limited to a movement of a specific rotational angle. The rotation in the present invention may be a rotation of 360° or more. The rotation in the present invention may be a rotation of less than 360°. The rotation in the present invention may be a rotation of less than 180°. The rotation in the present invention may be a rotation of less than 90°.

A connection in the present invention is not limited to a direct connection. The connection in the present invention may be an indirect connection. The indirect connection means a connection of two members by way of a member other than the two members.

An interlocking rotation in the present invention is not limited to a case where two members have the same rotational speed and the same rotational direction. The interlocking rotation in the present invention includes a case where two members have the same rotational direction but different rotational speeds. When the two members are directly connected with each other, the two members have the same rotational speed and the same rotational direction. Even when the two members are indirectly connected with each other, there may be a case where the two members have the same rotational speed and the same rotational direction. When two members are indirectly connected with each other by way of a member which changes a rotational speed, the two members have the same rotational direction but different rotational speeds. When two members are indirectly connected with each other by way of a member which reverses the rotational direction, the two members have the same rotational speed, but different rotational directions. When two members are connected with each other by way of a spring element or a cushioning element, time lag occurs in a rotational speed and a rotational direction between the two members. A connection in the present invention may also include the above-mentioned cases.

In the present invention, the description "a member extends along the direction, the axis, the member or the like"

also includes a case where the member leans with respect to the direction, the axis, the member or the like within a range of ±45°. The description "a member extends along the direction" means a state where the member continuously extends in the direction.

In the present invention, "a member extends in the "direction" also includes a case where the member leans with respect to the direction within a range of ±45°. The description "a member extends in the direction" means a state where the member continuously extends in the direction.

The casing member of the present invention may include a plurality of casing pieces. The plurality of casing pieces may include a front casing piece and a rear casing piece arranged in the front-back direction of the vehicle body. In this case, the plurality of casing pieces may include a joint portion which intersects with the front-back direction of the vehicle body. Further, the plurality of casing pieces may include a left casing piece and a right casing piece which are arranged in the left-right direction of the vehicle body. In this case, the plurality of casing pieces may include a joint portion which intersects with the left-right direction of the vehicle body.

An axis of rotation of the gear and the rotary shaft of the leaning drive mechanism of the present invention may be disposed along the front-back direction of the vehicle body. The axis of rotation of the gear and the rotary shaft of the leaning drive mechanism may be disposed along the left-right direction of the vehicle body. The axis of rotation of the gear and the rotary shaft of the leaning drive mechanism may be disposed along the up-down direction of the vehicle body.

The gear of the leaning drive mechanism of the present invention may include a plurality of gears. In this case, the plurality of gears may be speed reduction gears for decelerating a rotation. The plurality of gears may be gears which do not change a speed of rotation. The gear may be a spur gear. The gear may be a helical gear. The gear may be a worm gear.

The brake member of the leaning brake mechanism of the present invention may be disposed along the front-back direction of the vehicle body. The brake member of the leaning brake mechanism may be disposed along the left-right direction of the vehicle body. The brake member of the leaning brake mechanism may be disposed along the up-down direction of the vehicle body.

The leaning drive mechanism of the present invention may assist a leaning operation of a vehicle body, a left wheel, and a right wheel performed by a rider by applying a driving force which causes a support arm member to rotate with respect to the vehicle body. The term "assist" may include a case of amplifying a leaning operation. The term "assist" may include a case of suppressing a leaning operation. Further, the leaning drive mechanism of the present invention may control the leaning operation of the vehicle body, the left wheel, and the right wheel by applying a driving force which causes a support arm member to rotate with respect to the vehicle body irrespective of the leaning operation of the vehicle body, the left wheel, and the right wheel performed by a rider. For example, when the leaning vehicle is a self-driving vehicle, a driving force which is controlled in response to an input of various kinds of sensors may be applied. The leaning drive mechanism of the present invention has no limit based on the purpose for applying the driving force.

Terms and expressions used in this specification are used for the purpose of description, and are not used for the purpose of limiting interpretation. Any feature equivalent to the characteristic feature disclosed and described in this specification is not excluded, and it should be recognized that various modifications which fall within the scope of claims of the present invention are included in the present invention. The present invention can be embodied in many different embodiments. This disclosure should be construed to provide principle embodiments of the present invention. These embodiments are described in this specification with the understanding that these embodiments do not intend to limit the present invention to embodiments described and/or illustrated in this specification. The present invention is not limited to the embodiments described in this specification. The present invention also includes any embodiment including an equivalent element, modification, deletion, combination, improvement and/or a change which can be recognized by those who are skilled in the art based on this disclosure. A claim limitation should be broadly construed based on a term used in claim, and should not be limited to the embodiments described in this specification or in the prosecution of the present application.

REFERENCE SIGNS LIST 1 vehicle
5 vehicle body
11L left front wheel
11R right front wheel
30L left support arm
30R right support arm
33 leaning drive mechanism
36 connecting shaft
37 motor
37a motor shaft
41 brake shaft
42 brake disc
43 gear casing member
45 brake caliper
50 leaning brake mechanism
61 leaning mechanism

The invention claimed is:
1. A leaning vehicle comprising:
a vehicle body which leans left with turning of the leaning vehicle leftward in a left-right direction of the leaning vehicle, and leans right with turning of the leaning vehicle rightward in the left-right direction of the leaning vehicle;
a left wheel disposed at a left side of a center of the vehicle body in the left-right direction of the vehicle body;
a right wheel disposed at a right side of the center of the vehicle body in the left-right direction of the vehicle body, and at a right side of the left wheel;
a leaning mechanism including a support arm for each of the left wheel and the right wheel to support the left wheel and the right wheel, the support arm being supported by the vehicle body in a rotatable manner about a rotation axis extending in a front-back direction of the vehicle body and the support arm being configured to lean the vehicle body, the left wheel and the right wheel in a same direction;
a leaning drive mechanism including a drive source for generating a driving force which causes the support arm to rotate with respect to the vehicle body, the leaning drive mechanism being supported by the vehicle body; and a leaning brake mechanism applying a resistance to a rotation of the support arm with respect to the vehicle body, wherein the leaning drive mechanism includes a gear and a rotary shaft connected to the drive source and the support arm, and rotating in an interlocking manner with the support arm, and a gear casing member accommodating at least a portion of the gear and a portion of the rotary shaft, and the leaning drive mechanism transmits the driving force generated by the drive source to the support arm through the gear and the rotary shaft, the leaning brake mechanism includes: a brake member which is directly connected to one of the gear or the rotary shaft, and rotates in an interlocking manner with the support arm by way of the gear or the rotary shaft to which the brake member is directly connected; and a resistance applying member which applies a resistance to a motion of the brake member with respect to the vehicle body, and the gear and the rotary shaft of the leaning drive mechanism and the brake member of the leaning brake mechanism are rotatable with respect to the gear casing member of the leaning drive mechanism, and are supported by the vehicle body in a rotatable manner by way of the gear casing member of the leaning drive mechanism.

2. The leaning vehicle according to claim 1, wherein the gear casing member of the leaning drive mechanism includes a front casing piece and a rear casing piece arranged in the front-back direction of the vehicle body.

3. The leaning vehicle according to claim 1, wherein axes of rotation of the gear and the rotary shaft of the leaning drive mechanism and an axis of rotation of the brake member of the leaning brake mechanism are set so as to extend along the front-back direction of the vehicle body.

4. The leaning vehicle according to claim 1, wherein the gear casing member of the leaning drive mechanism includes a plurality of casing pieces, one of the plurality of casing pieces is supported by the vehicle body, and another of the plurality of casing pieces is supported by the vehicle body by way of said one of the plurality of casing pieces.

5. The leaning vehicle according to claim 1, wherein the gear of the leaning drive mechanism includes a plurality of gears, decelerates the driving force generated by the drive source, and transmits the driving force to the support arm, and the brake member of the leaning brake mechanism is connected to the gear or the rotary shaft of the leaning drive mechanism which rotates at a reduced rotational speed.

6. The leaning vehicle according to claim 1, wherein an upper end of the brake member is disposed at a position lower than an upper end of the gear casing member in an up-down direction of the vehicle body, and a lower end of the brake member is disposed at a position higher than a lower end of the gear casing member in the up-down direction of the vehicle body.

7. The leaning vehicle according to claim 1, wherein at least one of a front end or a rear end of the brake member is positioned between a front end and a rear end of the gear casing member in the front-back direction of the vehicle body.

8. The leaning vehicle according to claim 1, wherein the leaning drive mechanism includes an output shaft which outputs the driving force of the drive source, and is connected to the support arm, and the resistance applying member of the leaning brake mechanism applies a resistance to the brake member at a position higher than the output shaft in the up-down direction of the vehicle body.

9. The leaning vehicle according to claim 1, wherein at least one of a left end or a right end of the brake member is positioned between a left end and a right end of the gear casing member in the left-right direction of the vehicle body.

10. The leaning vehicle according to claim 1, wherein:
the brake member is a brake disc; and
the leaning drive mechanism is integrated with the brake member and is attachable to and detachable from the vehicle body and the leaning mechanism along with the brake member.

11. The leaning vehicle according to claim 1, wherein:
the leaning drive mechanism includes an output shaft for outputting the driving force generated by the drive source, the output shaft being connected to the support arm; and the brake member is connected to one of the gear and the rotary shaft through which the driving force generated by the drive source is transmitted to the support arm, the one of the gear or the rotary shaft to which the brake member is connected being different from the output shaft.

* * * * *